(12) United States Patent
Kim

(10) Patent No.: US 12,730,747 B2
(45) Date of Patent: Sep. 8, 2026

(54) MEMORY SYSTEM FOR READING DISTRIBUTED FIRMWARE AND AN OPERATION METHOD THEREOF

(71) Applicant: SK hynix Inc., Gyeonggi-do (KR)

(72) Inventor: Chang Han Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 4 days.

(21) Appl. No.: 18/896,893

(22) Filed: Sep. 26, 2024

(65) Prior Publication Data

US 2025/0272232 A1 Aug. 28, 2025

(30) Foreign Application Priority Data

Feb. 28, 2024 (KR) ........................ 10-2024-0028691

(51) Int. Cl.
*G06F 12/02* (2006.01)
*G06F 9/445* (2018.01)

(52) U.S. Cl.
CPC ...... *G06F 12/0246* (2013.01); *G06F 9/44521* (2013.01)

(58) Field of Classification Search
CPC ......................... G06F 12/0246; G06F 9/44521
See application file for complete search history.

(56) References Cited

U.S. PATENT DOCUMENTS 7,962,777 B2 6/2011 Gonzalez et al.
9,229,642 B2 1/2016 Shu et al.
11,456,036 B1 * 9/2022 Lu ...................... G11C 13/0035
2005/0160217 A1 * 7/2005 Gonzalez ............ G06F 11/1068 714/E11.038
2008/0052506 A1 * 2/2008 Iima .................... G06F 11/1417 713/1
2008/0181018 A1 * 7/2008 Nagadomi ......... G11C 16/3431 365/185.25
2014/0369124 A1 * 12/2014 Moon .................... G11C 16/16 365/185.11
2016/0162353 A1 * 6/2016 Manohar ............... H03M 13/27 714/760
2016/0210132 A1 * 7/2016 Gerhart ..................... G06F 8/71
2017/0185781 A1 * 6/2017 Kim .......................... G06F 8/65
2018/0059948 A1 * 3/2018 Lee ..................... G06F 12/0238
2020/0089410 A1 * 3/2020 Park ........................ G06F 3/064
2021/0089219 A1 * 3/2021 Pahwa .................. G06F 3/0683
2023/0367680 A1 * 11/2023 Tong ................... G06F 11/2023

* cited by examiner

*Primary Examiner* — Jane W Benner
(74) *Attorney, Agent, or Firm* — IP & TGROUP LLP

(57) ABSTRACT

A memory system includes a memory device and a controller. The memory device includes firmware distributed and stored in plural locations. The controller is configured to read the firmware from a different location selected among the plural locations whenever the controller loads the firmware distributed and stored in the memory device.

20 Claims, 10 Drawing Sheets

330

| FW#_# | BLK# | PL# | PG# | RD_C | E/W | St_Info |
|---|---|---|---|---|---|---|
| FW0_0 | 0 | 0 | 0 | 20 | 5 | Normal |
| FW0_1 | 0 | 1 | 0 | 1 | 30 | Normal |
| ⋮ | ⋮ | ⋮ | ⋮ | ⋮ | ⋮ | ⋮ |
| FW0_N | 2 | 4 | 4 | 6 | 8 | Normal |
| FW1_0 | 5 | 2 | 6 | 50 | 90 | Warning |
| FW1_1 | 3 | 1 | 2 | 7 | 6 | Normal |
| ⋮ | ⋮ | ⋮ | ⋮ | ⋮ | ⋮ | ⋮ |

| | Plane0 | Plane1 | Plane2 | Plane3 |
|---|---|---|---|---|
| Page0 | fw0 ① | fw0 | fw0 | fw0 |
| Page1 | fw1 | fw1 ② | fw1 | fw1 |
| Page2 | fw2 | fw2 | fw2 ③ | fw2 |
| Page3 | fw3 | fw3 | fw3 | fw3 ④ |
| Page4 | fw4 ⑤ | fw4 | fw4 | fw4 |
| Page5 | fw5 | fw5 ⑥ | fw5 | fw5 |
| Page6 | fw6 | fw6 | fw6 ⑦ | fw6 |
| Page7 | fw7 | fw7 | fw7 | fw7 ⑧ |

| | Plane0 | Plane1 | Plane2 | Plane3 |
|---|---|---|---|---|
| Page0 | fw0 | fw0 ⓐ | fw0 | fw0 |
| Page1 | fw1 | fw1 | fw1 ⓑ | fw1 |
| Page2 | fw2 | fw2 | fw2 | fw2 ⓒ |
| Page3 | fw3 ⓓ | fw3 | fw3 | fw3 |
| Page4 | fw4 | fw4 ⓔ | fw4 | fw4 |
| Page5 | fw5 | fw5 | fw5 ⓕ | fw5 |
| Page6 | fw6 | fw6 | fw6 | fw6 ⓖ |
| Page7 | fw7 ⓗ | fw7 | fw7 | fw7 |

MEMORY SYSTEM FOR READING DISTRIBUTED FIRMWARE AND AN OPERATION METHOD THEREOF

CROSS-REFERENCE TO RELATED APPLICATIONS

This patent application claims the benefit of priority under 35 U.S.C. § 119(a) to Korean Patent Application No. 10-2024-0028691, filed on Feb. 28, 2024, the entire disclosure of which is incorporated herein by reference.

TECHNICAL FIELD

Various embodiments of the present disclosure relate to a memory system, and more particularly, to an apparatus and an operation method for improving safety, maintenance, or management of firmware included in the memory system.

BACKGROUND

A data processing system including a memory system or a data storage device can store more amounts of data in the data storage device and store data in the data storage device more quickly. The memory system has been developed to output data stored in the data storage device more quickly. The data storage device may include non-volatile memory cells and/or volatile memory cells for storing data. Further, the memory system may include firmware used to control operations of internal components and maintain or manage performance of the memory system. Firmware maintenance and management may affect performance and durability of the memory system.

BRIEF DESCRIPTION OF THE DRAWINGS

The description herein makes reference to the accompanying drawings wherein like reference numerals refer to like parts throughout the figures.

DETAILED DESCRIPTION

Figure 1:
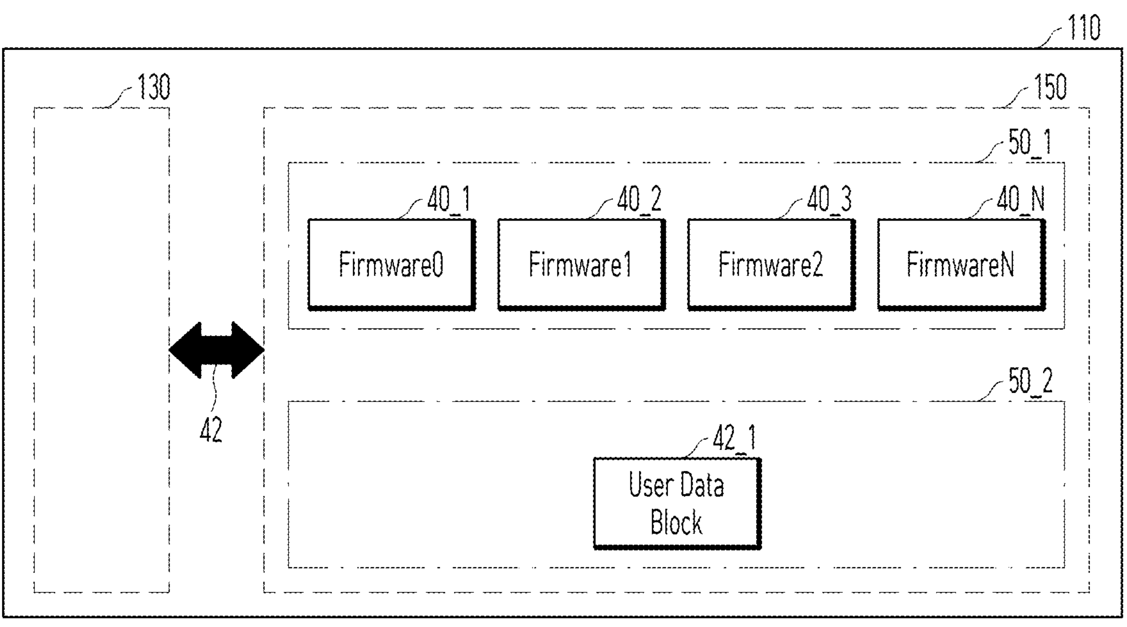
FIG. 1 is a block diagram describing an apparatus controlling firmware in a memory system in accordance with an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor (s), software, and memory (ies) that work together to cause an apparatus, such as a mobile phone or server, to perform various functions and (c) circuits, such as a microprocessor (s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or a portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Embodiments of the present disclosure can provide a memory device, a memory system including the memory device, or a data processing apparatus including the memory system.

An embodiment of the present disclosure can provide a device and an operation method that improves reliability of a storage region or storage area allocated for storing firmware within a memory device or improves an operational safety of the memory device or the memory system. The device or the operation method can access the memory device to reduce a deviation of the operating states regarding plural locations in which the firmware is stored.

Further, an embodiment of the present disclosure can improve performance of a memory device or a memory system through a device and an operation method for changing an access location for reading or loading firmware to reduce a deviation of stress or disturb that may occur during a read operation in an area where firmware is stored.

In an embodiment of the present disclosure, a memory system can include a memory device comprising firmware distributed and stored in plural locations; and a controller configured to read the firmware from a different location selected among the plural locations whenever loading the firmware.

The controller can be configured to, after reading the firmware from a first location among the plural locations at a first timing, read the firmware at a second timing from a second location among the plural locations, where stress or disturb occurs due to a read operation performed in the first location.

In the memory system, a first page included in the first location and a second page included in the second location individually comprise memory cells coupled to a same word line.

The memory cells included in the first and second pages can be disposed on a same memory layer.

The controller can be configured to, after power is supplied, select a location with a lowest at least one of read counts and program/erase cycles among the plural locations, and load the firmware stored in a selected location.

In the memory system, each of the plural locations can include plural pages included in different memory blocks or different memory planes. The plural pages can be consecutive pages.

The controller can be configured to read the firmware including several parts stored in the plural pages, each part stored in the different memory blocks or the different memory planes.

The controller can be configured to read a first part of the firmware from a first memory plane in the memory device and a second part, which is distinguished from the first part, from a second memory plane in the memory device.

The controller can be further configured to: generate or update at least one of read counts or program/erase cycles in each at least one of memory block, each memory plane, and each memory page, which is associated with the plural locations; and store the at least one of generated or updated read counts or program/erase cycles in the memory device.

The controller can be further configured to select an access location of the firmware so that a deviation of at least one of read counts and program/erase cycles for each of the plural locations is reduced.

In another embodiment of the present disclosure, a controller can be coupled to a memory device in which firmware is copied and stored in plural locations. The controller can include at least one processor and at least one memory. The controller can be configured to: load the firmware stored in a selected location among the plural locations; estimate, while loading the firmware from the selected location, another location among the plural locations where stress or disturb occurs; and designate an estimated location as the selected location for a next loading of the firmware.

The controller can be further configured to compare at least one of read counts and program/erase cycles for each of the plural locations; and designate, as the selected location, a location with a lowest at least one of read counts and program/erase cycles among the plural locations.

Each of the plural locations can include plural pages included in different memory blocks or different memory planes.

The controller can be configured to read the firmware including several parts stored in the plural pages, each part stored in the different memory blocks or the different memory planes.

The controller can be further configured to generate or update at least one of read counts and program/erase cycles in each memory block, each memory plane, or each memory page, which is associated with the plural locations; and store the at least one of generated or updated read counts and the program/erase cycles in the memory device.

The controller can be further configured to select an access location of the firmware so that a deviation of the at least one of read counts and program/erase cycles for each of the plural locations is reduced.

In another embodiment of the present disclosure, a method for operating a memory system can include selecting at least one of plural locations in a memory device, the plural locations storing firmware; loading the firmware stored in a selected location among the plural locations; estimating, while loading the firmware from the selected location, another location among the plural locations where stress or disturb occurs; and designating an estimated location as the selected location for a next loading of the firmware.

The method can further include comparing at least one of read counts and program/erase cycles for each of the plural locations; and designating, as the selected location, a location with a lowest at least one of the read counts and the program/erase cycles among the plural locations.

The method can further include selecting an access location of the firmware so that a deviation of at least one of read counts and program/erase cycles for each of the plural locations is reduced.

These and other features and advantages of the invention will become apparent from the detailed description and the accompanying drawings of embodiments of the present disclosure. Embodiments will now be described with reference to the accompanying drawings, wherein like numbers reference like elements.

FIG. 1 is a block diagram describing an apparatus controlling firmware in a memory system 110 in accordance with an embodiment of the present disclosure. In FIG. 1, the memory system 110, in accordance with an embodiment of the present disclosure, can include a controller 130 and a memory device 150. The memory system 110 may be engaged with another device, e.g., a computing device.

The controller 130 may include at least one processor and at least one memory. The memory device 150 may be coupled to the controller 130 via at least one data path 42, and may include a plurality of unit memory cells, each capable of storing data of at least one bit. For example, the memory device 150 may be a non-volatile memory including at least one die and may include a plurality of memory blocks including a plurality of memory cells.

The memory device 150 can include a system area 50_1 and a user data area 50_2. The system area 50_1 can store plural firmware copies 40_1, 40_2, 40_3, 40_N. The user data area 50_2 may include at least one user data block 42_1 which can store user data transmitted to or from the computing device (e.g., a host 102 shown in FIG. 12) with which the memory system 110 is operatively engaged. Representative data stored in the user data area 50_2 can include an operating system (OS), file system information, application programs, and user requested data.

The memory device 150 including plural memory blocks can store plural firmware copies 40_1, 40_2, 40_3, 40_N. The firmware can include commands, programs, engines and the like to support basic (or fundamental) operations of the memory system 110. The plural firmware copies 40_1, 40_2, 40_3, 40_N are the same, but can be stored in different locations within the memory device 150. The firmware stored in the memory device 150 can be responsible for setting up the memory system initially. For example, the firmware may perform functions such as internal operation control, initialization, self-diagnosis and the like of the memory system 110.

In particular, the firmware may function as low-level software for providing an interface between hardware configuration of the memory system 110 and application-level software or an operating system of a computing device engaged with the memory system 110. The firmware stored in a specific location of the memory device 150 may be transferred to the controller 130 when power is supplied to the memory system 110. The controller 130 can use the firmware to perform the basic operations. The firmware may be executable even if the memory system 110 is initialized. For example, a first firmware copy 40_1 may be stored at a fixed position in the memory device 150. When the power is supplied, the first firmware copy 40_1 can be loaded or accessed based on a request or a command issued by the controller 130.

In accordance with an embodiment, the firmware may include a boot loader. The boot loader may function as a program or a command that performs the role of transferring the control of the memory system 110 to another device such as the computing device engaged with the memory system 110, when an operating system or an application program is loaded and executed in the other device.

The firmware above described is for supporting the basic operations in the memory system 110. When the firmware is abnormal due to any of various reasons, the memory system 110 may be difficult to operate normally. To avoid such a case, the memory device 150 can include the plural firmware copies 40_1, 40_2, 40_3, 40_N. For example, when the first firmware copy 40_1 includes an error or is not working properly, the controller 130 can read or load another firmware copy among other firmware copies 40_2, 40_3, 40_N. That is, the plural firmware copies 40_1, 40_2, 40_3, 40_N in the memory device 150 are copied and stored in a distributed manner.

In accordance with an embodiment, the plural firmware copies 40_1, 40_2, 40_3, 40_N could be updated. Further, the memory system 110 can store plural firmware with different versions (e.g., a current version and a previous version) in the memory device 150. For example, the plural firmware copies 40_1, 40_2, 40_3, 40_N can include firmware with different versions. Thus, different versions of the firmware can be stored in different locations of the memory device 150.

The plurality of memory blocks in the memory device 150 may be subject to various characteristics that arise due to the construction and operation of a non-volatile memory device. One such characteristic is read disturb. The read disturb includes a phenomenon in which peripheral unit memory cells are affected in the process of reading at least one unit memory cell in a block. When unit memory cells of a block are arranged in a matrix form and plural pieces of data are outputted from unit memory cells in a specific row corresponding to a word line, the distribution of threshold voltage corresponding to data stored in the peripheral unit memory cells may be changed by a voltage and a current applied into the unit memory cells in the specific row. The read disturb can occur when at least one of the plural firmware copies 40_1, 40_2, 40_3, 40_N is read or loaded. Given the nature of the read disturb, it may be more effective for the controller 130 not to repeatedly read or access the firmware stored in a specific location to keep the firmware copies safe and able to operate normally.

Another characteristic of the non-volatile memory cells in the plurality of memory blocks of the memory device 150 is that data retention may not be practically permanent. The plural pieces of data stored in the unit memory cells can gradually disappear or be erased over time. For example, a data entry stored in the unit memory cell of the non-volatile memory device may cause a change of threshold voltage in a gate structure. According to the piece of data, the controller can confine some charges in a specific layer in the gate structure. It is possible to ascertain the value of the piece of data stored in the unit memory cell. As time passes in a natural state, however, the threshold voltage range may become more diffused because changes may move or go back to equilibrium condition, and later, it may become difficult to specify a range of the threshold voltage in the unit memory cell. In this case, the unit memory cell may lose data when the controller cannot identify an original range of the threshold voltage. The data retention of a unit memory cell, which is related to the performance of the memory device, may be characterized as a retention time. As described above, when the controller 130 does not access any of the plural firmware copies 40_1, 40_2, 40_3, 40_N within the retention time in consideration of the characteristics of the read disturb, the not accessed copy among the plural firmware copies 40_1, 40_2, 40_3, 40_N may be lost.

In addition, a device or an operation method can be provided for checking whether the plural firmware copies 40_1, 40_2, 40_3, 40_N are normally operable. When considering the characteristics of read disturbance, accessing or reading the plural firmware copies 40_1, 40_2, 40_3, 40_N may be not good. However, when considering the characteristics of data retention, the plural firmware copies 40_1, 40_2, 40_3, 40_N should be read or accessed. How the controller 130 reads or accesses the plural firmware copies 40_1, 40_2, 40_3, 40_N may have a complementary relationship, referring to the characteristics of read disturbance and data retention.

Based on operation information regarding plural locations where the plural firmware copies 40_1, 40_2, 40_3, 40_N are stored, the controller 130 can estimate a life time or a heathy status of the plural firmware copies 40_1, 40_2, 40_3, 40_N stored in those locations. A unit memory cell of a non-volatile memory device has a preset lifespan. Repeatedly programming data to a unit memory cell and erasing the programmed data may cause minor damage to the unit memory cell. In the memory device 150, an operation of programming data can be performed on a page basis, but an operation of erasing data can be performed on a memory block basis. Therefore, based on erase/write operations (E/W Cycles) and/or program/erase cycles (P/E Cycles), the controller 130 can estimate a life time or a heathy status of each memory block in the memory device 150. According to an embodiment, for the plural locations where the plural firmware copies 40_1, 40_2, 40_3, 40_N are stored in the memory device 150, read counts and erase/write operations (E/W Cycles) could be created, updated, and saved.

In addition, according to an embodiment, when there is a large deviation in the read counts and the erase/write operations (E/W cycles) regarding the plural locations where the plural firmware copies 40_1, 40_2, 40_3, 40_N are stored, the operational safeties or securities of the plural firmware copies 40_1, 40_2, 40_3, 40_N could vary greatly depending on the plural locations. Therefore, the controller 130 can access, read, erase, or store the plural firmware copies 40_1, 40_2, 40_3, 40_N so that the deviation of operation information regarding the plural locations where the plural firmware copies 40_1, 40_2, 40_3, 40_N are stored could be reduced.

Figure 2:
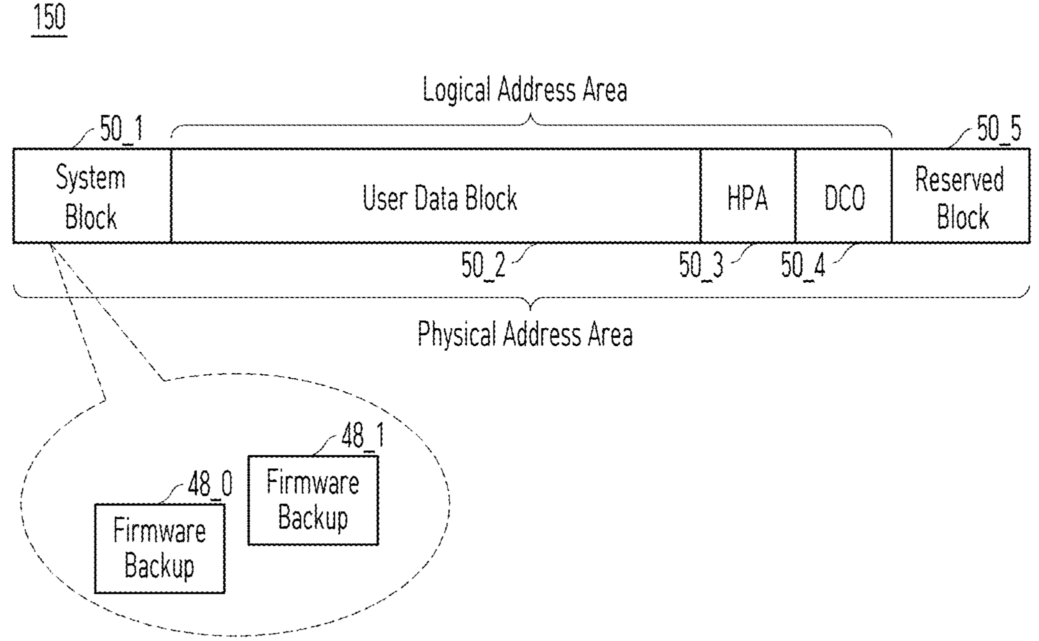
FIG. 2 is a diagram describing a data structure used in a memory system in accordance with an embodiment of the present disclosure

FIG. 2 illustrates internal logical configuration of the memory device 150. The memory device 150 illustrated in FIG. 1 is described in terms of a logical storage device, not a physical component.

Specifically, the system area 50_1 is a space in which system blocks including the firmware block 48_0, the firmware backup block 48_1, and the like described in FIG. 1 may be included. For example, the firmware block 48_0 and the firmware backup block 48_1 can individually include at least some parts of the plural firmware copies 40_1, 40_2, 40_3, 40_N shown in FIG. 1. The system area 50_1 is a physical address area accessible by using a physical address only, such as a physical block address of the memory device 150, not a logical address used by a computing device or a host. Thus, even if the memory system including the memory device 150 is associated with the computing device, the user may not be able to access the system area 50_1 via the computing device. The system area 50_1 may have limited access. That is, it may only be accessed by a special instruction or a program. The system area 50_1 may include basic information for recognizing hardware configuration in the memory system 110 or the memory device 150, firmware for supporting basic operations of the memory system 110, and the like. The firmware may be one of the most important data stored in the memory device 150. The memory system 110 can perform normal operation only if the firmware is not damaged. To this end, the memory system 110 can store plural firmware copies 40_1, 40_2, 40_3, 40_N in different locations within the memory device 150. Even if the first firmware copy 40_1 among the plural firmware copies 40_1, 40_2, 40_3, 40_N is damaged, the memory system 110 can perform normal operation based on other undamaged firmware copies 40_2, 40_3, 40_N.

The user data area 50_2 including user data blocks may store user data or the like to be transmitted from/to a computing device with which the memory system is associated. Representative data included in the user data area 50_2 may include an operating system (OS), file system information, an application program, or the like.

The user data area 50_2 is a logical address area that can be accessed by using a logical address such as a logical block address or the like. For example, a logical block address (LBA), which is used in a logical block addressing method, may be in a format used for a computing device or a host to specify a location of data recorded in a storage device. In the case of a conventional hard disk, an addressing method indicating a physical structure in a hard disk, such as a cylinder, a head, and a sector (a Cylinder-Head-Sector, CHS) was used. However, the addressing method corresponding to the physical structure of the hard disk has reached the limit as the storage capacity of the hard disk increases. In such a large-capacity storage device, the address can be specified in a manner that plural sectors are arranged in a logical sequence in a row, and the plural sectors are numbered (for example, in order from 0), regardless of the physical structure of the hard disk. While a computing device (e.g., the host 102 shown in FIG. 12) can transfer or point a data entry with a logical block address (LBA), the memory system 110 should match and manage computing device's logical block address with a physical location such as a physical address which can indicate an actual location at which the data entry is stored inside the memory device 150. Such information for associating a logical address with a physical address may be included in metadata or map data, which may be distinguishable from a user data entry stored or read through the host 102.

A reserved area 50_5 including at least one reserved block in the memory device 150 can be used to store information for an operation with a computing device or another system which is associated with the memory system, or can be used for other configurations embedded in the memory system, in accordance with an embodiment. For example, in the reserved area 50_5, an error correction code (ECC) for the ECC circuitry, and the like can be stored.

Like the system area 50_1, the reserved area 50_5 is a physical address area accessible by a physical address only such as a physical block address. The memory system 110 stores data used for supporting plural operations required or necessary for a manufacturing process, a process of being configured or mounted on the host 102 or a computing device or an operation engaged or associated with the host 102 or a computing device, in the reserved area 50_5. While the system area 50_1 is used to support the basic operation of the memory system, the reserve area 50_5 may be used to extend operation(s) supported by the memory system.

On the other hand, in accordance with an embodiment, the memory device 150 may further include at least one of a host protection area (HPA) 50_3 or a device configuration overlay (DCO) 50_4. Herein, the host protection area (HPA) has been suggested from a technology supported by the Advanced Technology Attachment (ATA)-4 standard. The device configuration overlay (DCO) 50_4 has been supported from the ATA-6 standard. The ATA may include a standard technology of an interface used in a laptop or desktop computer, and may be referred to as an Integrated Device Environment (IDE) or Enhanced IDE (EIDE) method.

The host protection area (HPA) 50_3 can be used mainly for a BIOS diagnostic utility, a system boot, and a system recovery. For example, the host protection areas (HPA) 50_3 may not be accessible via the BIOS of the host 102. That is, it may be an area of the memory system that is not visible or open to the operating system (OS) and is not modified usually by a user. The host protection area (HPA) 50_3 can support a system recovery without a separate medium such as CD or DVD.

The device configuration overlay (DCO) 50_4 can be used by the memory system manufacturer to adjust the disk size. For example, each manufacturer may have storage capacities of 300 GB, 500 GB, 750 GB, 1 TB, etc., depending on a model of the memory system. The device configuration overlay (DCO) 50_4 can be made to look like a memory system made in several sizes, such as 60 GB, 100 GB, 200 GB, 500 GB, or 1 TB, even though the memory system has been not differently manufactured to depend upon its storage capacity. The device configuration overlay (DCO) 50_4 may also be inaccessible via the BIOS of the host 102, but may be accessible through special commands defined by the manufacturer of the memory system 110.

According to an embodiment, the memory system 110 may generate, update, or store operating state information corresponding to the plural locations where the plural firmware copies 40_1, 40_2, 40_3, 40_N are stored. For example, the memory system 110 can perform operations of generating, updating, or saving a read count, erase/write operation (E/W Cycle) or program/erase operations (P/E Cycle) for the plural locations where the plural firmware copies 40_1, 40_2, 40_3, 40_N are stored. In addition, the memory system 110 can access the plural firmware copies 40_1, 40_2, 40_3, 40_N to reduce the deviation of operating state information with respect to the plural locations where the plural firmware copies 40_1, 40_2, 40_3, 40_N are stored.

Although not shown, in accordance with an embodiment, the memory device 150 may support an IDE or EIDE scheme as well as Small Computer System Interface (SCSI) scheme. The areas in the memory device 150 may be allocated or allocated differently depending on a configuration or an operation method supported by the memory system 110.

Figure 3:
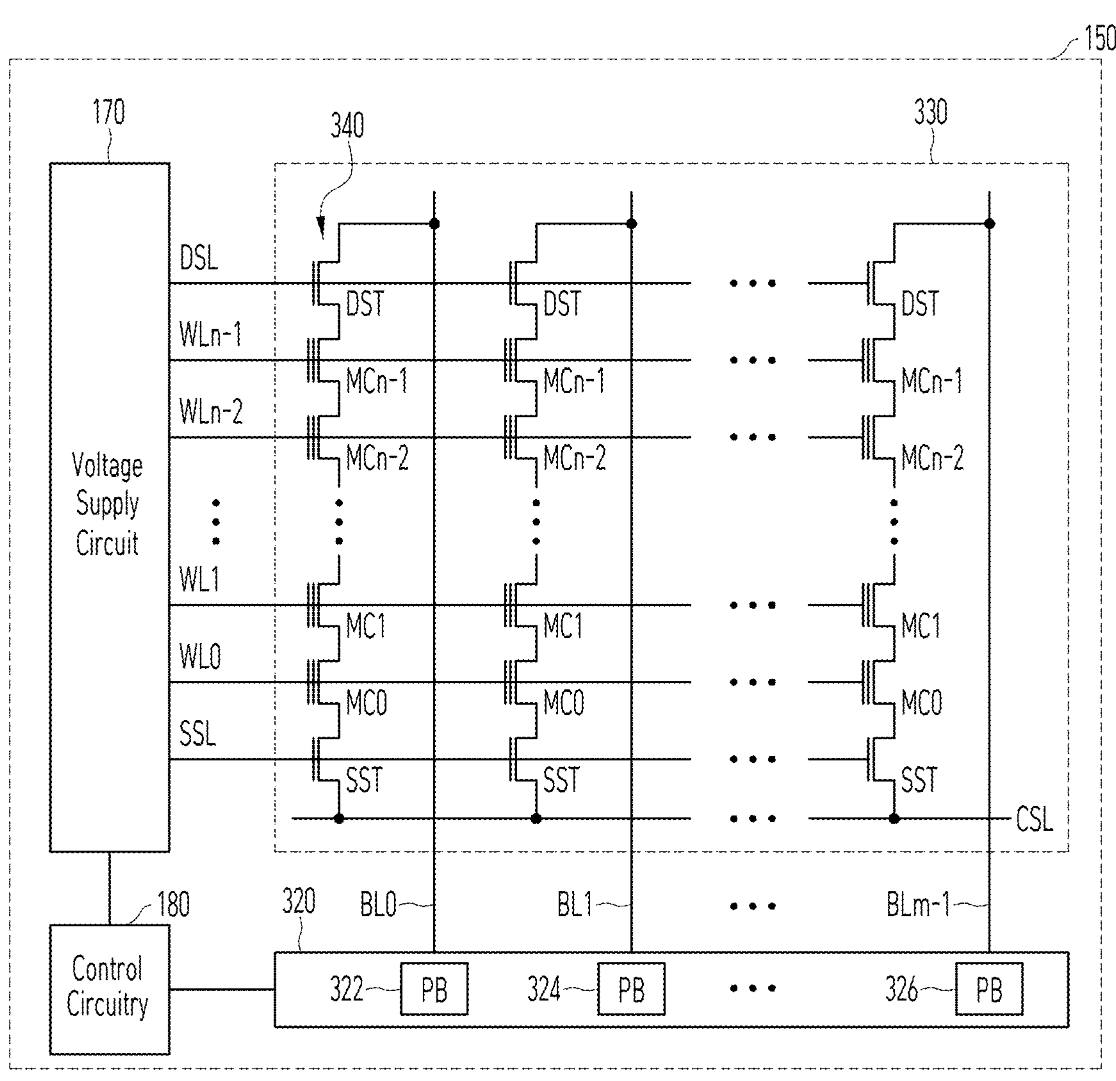
FIG. 3 illustrates a memory device according to another embodiment of the present disclosure.

FIG. 3 illustrates a memory device according to another embodiment of the present disclosure. Specifically, FIG. 3 illustrates a memory cell group (e.g., a cell array) included in a memory plane or a memory die included in the memory device 150 according to an embodiment of the present disclosure.

Referring to FIG. 3, the memory device 150 may include at least one memory group 330 having a plurality of cell strings 340. Each cell string 340 may include a plurality of non-volatile memory cells MC0 to MCn−1 connected to a respective bit line of a plurality of bit lines BL0 to BLm−1. The cell strings 340 are disposed in respective columns of the memory group 330, and each cell string 340 can include at least one drain select transistor DST and at least one source select transistor SST. The non-volatile memory cells MC0 to MCn−1 of each cell string 340 may be connected in series between a drain select transistor DST and a source select transistor SST. Each of the non-volatile memory cells MC0 to MCn−1 may be configured as a multi-level cell (MLC) that stores a data item having plural bits per cell. The cell strings 340 may be electrically connected to corresponding bit lines of the bit lines BL0 to BLm−1.

In an embodiment, the memory group 330 may include NAND-type flash memory cells MC0 to MCn−1 shown in FIG. 3. In another embodiment, the memory group 330 can be implemented as a NOR-type flash memory, a hybrid flash memory in which at least two different types of memory cells are mixed or combined, or a one-chip NAND flash memory in which a controller is embedded in a single memory chip. In an embodiment, the memory group 330 can include a flash memory cell including a charge trap flash (CTF) layer that includes a conductive floating gate or insulating layer.

According to an embodiment, the memory device 150 shown in FIG. 3 can include at least one memory block. The memory group 330 can have a two-dimensional (2D) or three-dimensional (3D) structure. For example, each of the memory blocks in the memory device 150 may be implemented as a 3D structure, for example, a vertical structure. Each of the memory blocks may have a three-dimensional structure extending along first to third directions, for example, an x-axis direction, a y-axis direction, and a z-axis direction.

The memory group 330 including at least one memory block can be coupled to a plurality of bit lines BL, a plurality of source selection lines SSL, a plurality of drain selection lines DSL, a plurality of word lines WL (e.g., WL0 to WLn−1), a plurality of dummy word lines DWL (not shown), and a plurality of common source lines CSL. According to an embodiment, some word lines among the plurality of word lines WL (e.g., WL0 to WLn−1) can be used as the plurality of dummy word lines DWL for data safety. In one embodiment, the memory group 330 can include a plurality of NAND strings NS which, for example, may respectively correspond to cell strings 340. Each NAND string NS may include a plurality of memory cells MC and may be connected to a respective bit line of the bit lines BL. In addition, the source select transistor SST of each NAND string NS may be connected to a common source line CSL, and the drain select transistor DST of each NAND string NS can be connected to a corresponding bit line BL. In each NAND string NS, the memory cells MC may be arranged between the source select transistor SST and the drain select transistor DST.

The memory device 150 may include a voltage supply circuit 170 which can supply a word line voltage e.g., one or more predetermined voltages such as a program voltage, a read voltage, and a pass voltage, for respective word lines according to an operation mode, or may supply a voltage to a bulk, e.g., a well region, in which each memory block including the memory cells MC0, MC1, . . . , MCn−1 are disposed. In this case, a voltage generating operation of the voltage supply circuit 170 may be performed under control of a control circuitry 180. Also, the voltage supply circuit 170 may generate a plurality of variable read voltages to distinguish a plurality of data items from each other.

In response to the control of the control circuitry 180, one of the memory blocks (or sectors) of the memory cell array may be selected, and one of the word lines of the selected memory block may be selected. Word line voltages may be supplied to the selected word line and the unselected word line of the memory group 330, individually. The voltage supply circuit 170 may include a voltage generation circuit for generating target voltages having various levels, which are applicable to word lines of the memory group 330.

The memory device 150 may also include a read/write circuit 320 controlled by the control circuitry 180. The read/write circuit 320 may operate as a sense amplifier or a write driver according to an operation mode. For example, in a verify operation and a read operation, the read/write circuit 320 may operate as a sense amplifier for reading the data item from the memory cell array. In a program operation, the read/write circuit 320 may operate as a write driver that controls potentials of bit lines according to a data item to be stored in the memory cell array. The read/write circuit 320 may receive the data item to be programmed to the cell array from page buffers during the program operation. The read/write circuit 320 can drive bit lines based on the input data item. To this end, the read/write circuit 320 may include a plurality of page buffers (PB) 322, 324, 326, with each page buffer corresponding to each column or each bit line, or each column pair or each bit line pair. According to an embodiment, a plurality of latches may be included in each of the page buffers 322, 324, 326. According to an embodiment, the number of latches or page buffers coupled to each bit line can be equal to, or greater than, the number of bits of data stored in the memory cells MC.

The page buffers 322, 324, 326 may be coupled to a data input/output device, e.g., a serialization circuit or a serializer, through a plurality of buses BUS. When each of the page buffers 322, 324, 326 is coupled to the data input/output device through different buses, a delay that may occur in data transmission from the page buffers 322, 324, 326 can be reduced. For example, each page buffer 322, 324, 326 can perform the data transmission without a waiting time.

According to an embodiment, the memory device 150 may receive a write command, write data, and information, e.g., a physical address, regarding a location in which the write data is to be stored. The control circuitry 180 causes the voltage supply circuit 170 to generate a program pulse, a pass voltage, etc., used for a program operation performed in response to a write command, and to generate one or more voltages used for a verification operation performed after the program operation.

When a multi-bit data item is programmed in non-volatile memory cells included in the memory group 330, the error rate might be higher than that when a single-bit data item is stored in the non-volatile memory cells. For example, an error in the non-volatile memory cells may be induced due to cell-to-cell interference (CCI). To reduce error in the non-volatile memory cells, a width (deviation) of a threshold voltage distribution, corresponding to stored data items between the non-volatile memory cells, should be reduced.

To this end, the memory device 150 can perform an incremental step pulse programming (ISPP) operation to effectively make a narrow threshold voltage distribution of the non-volatile memory cells. In an embodiment, the memory device 150 can use the ISPP operation for multi-step program operations. For example, the memory device 150 may divide a program operation into a Least Significant Bit (LSB) program operation and a Most Significant Bit (MSB) operation according to a predetermined order between the non-volatile memory cells or pages.

A multi-bit value programmed in a memory cell in a NAND flash memory (e.g., NAND-type flash memory cells MC0 to MCn−1 in the memory group 330) can be determined based on a threshold voltage window or a threshold voltage distribution to which the cell's threshold voltage belongs. As a size of each memory cell shrinks and more bits (e.g., 3-bit, 4-bit, or 5-bit) of data are programmed per memory cell, a width of the threshold voltage window used to represent each multi-bit value becomes narrower, increasing an error rate when determining the multi-bit value stored in the memory cell. This is because process variations become more widespread when an amount of charge stored in each memory cell decreases with a feature size, resulting in large differences in threshold voltages of different memory cells storing the same value. As a result, it becomes increasingly difficult to determine which value a threshold voltage of a memory cell corresponds to.

According to an embodiment, the control circuitry 180 may include a read retry table (RRT). The RRT may be stored in the memory device 150. A read error may occur in a process of applying a read voltage to a non-volatile memory cell in the memory device 150 through a word line and reading data stored in the non-volatile memory cell. The control circuitry 180 in the memory device 150 may manage information regarding a read retry mechanism for resolving read errors. One of the information regarding the read retry mechanism is the read RRT. The read retry mechanism uses the RRT for a recorded location where the error has occurred, so that the memory device 150 can ensure data integrity by applying an appropriate correction value (e.g., changing a read voltage level) when re-reading.

Figure 4:
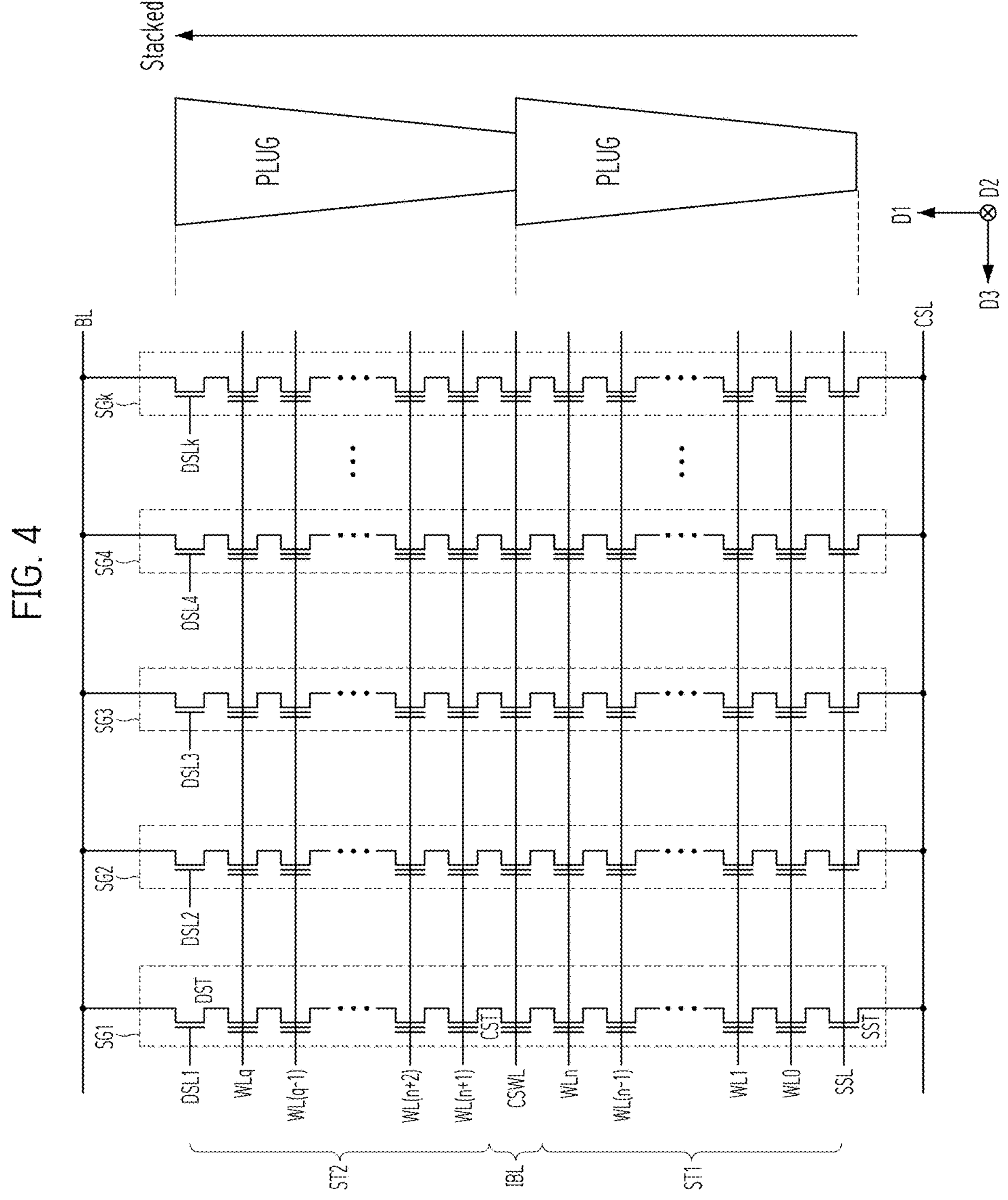
FIG. 4 illustrates a memory cell array according to another embodiment of the present disclosure.

FIG. 4 illustrates a memory cell array according to another embodiment of the present disclosure.

Referring to FIG. 4, the memory cell array may have a structure including portions or layers stacked in a vertical direction D1. The memory cell array may include at least one memory block. Hereinafter, a direction substantially perpendicular to the upper surface of the substrate may be defined as a first direction D1, and two directions parallel to the upper surface of the substrate and intersecting each other may be defined as the second direction D2 and the third direction D3, individually. For example, the second direction D2 and the third direction D3 may intersect each other substantially perpendicularly. The first direction D1 may be referred to as a vertical direction, the second direction D2 may be referred to as a row direction, and the third direction D3 may be referred to as a column direction. The direction indicated by the arrow in the drawing and the direction opposite to it are described as the same direction.

For convenience of description, FIG. 4 shows NAND strings or cell strings SG1 to SGk connected to one bit line BL and one common source line CSL among the cell strings included in the memory block.

The memory block may include a plurality of cell strings SG1 to SG5 connected between the same bit line (BL) and the common source line CSL. Each of the cell strings SG1 to SGk can include at least one source select transistor SST controlled by a source select line SSL, plural memory cells controlled by word lines WL, a central switching transistor CST disposed in an intermediate boundary layer IBL and controlled by a central switching word line CSWL, and a drain select transistor DST controlled by each drain select line DSL1, DSL2, DSL3, . . . , DSLK.

According to an embodiment, plural memory cells connected to at least one word line located at both ends of first and second stacks ST1, ST2 in the first direction D1 may be dummy cells. Any data may not be stored in the dummy cells. Further, according to an embodiment, the dummy cells may be used to store data having a smaller number of bits than other memory cells. According to an embodiment, the intermediate boundary layer IBL may include at least one gate line. One gate line corresponds to the central switching word line CSWL which can simultaneously control switching operations of the central switching transistors CST connected thereto. Further, although FIG. 4 illustrates a structure in which the first and second stacks ST1, ST2 are stacked, three or more stacks may be vertically stacked in the cell array 330. When a plurality of stacks are stacked, an intermediate boundary layer IBL may be disposed between each two stacked stacks. The intermediate boundary layer IBL may include at least one switching transistor configured to couple memory cells in one stack of the two stacks to other memory cells in the other stack.

FIG. 4 shows an embodiment in which the source select transistors SST included in the plurality of cell strings SG1 to SGK are connected to the common selection line CSL. However, according to an embodiment, a certain number of source select transistors could be coupled to each of plural source ground selection lines.

Referring to FIGS. 2 to 4, the cell array 330 can include a plurality of memory blocks arranged along a plurality of directions D1, D2, D3. In an embodiment, a memory block may be selected by the control circuitry 180 shown in FIG. 3. For example, a read voltage, a program voltage, or an erase voltage may be applied to a memory block and a word line selected by the control circuitry 180.

Each of the cell strings SG1 to SGk may include a plurality of switch transistors as well as a plurality of memory cells capable of storing data. Here, the plurality of switch transistors can include a drain select transistor DST, a source select transistor SST, and a central switching transistor CST. FIG. 4 shows an embodiment in which each of the cell strings SG1 to SGk includes one drain select transistor DST, one source select transistor SST, and one central switching transistor CST, respectively. However, according to an embodiment, each of the cell strings SG1 to SGk may include a plurality of drain select transistors DST, a plurality of source select transistors SST, or a plurality of intermediate switching transistors CST.

Figure 5:
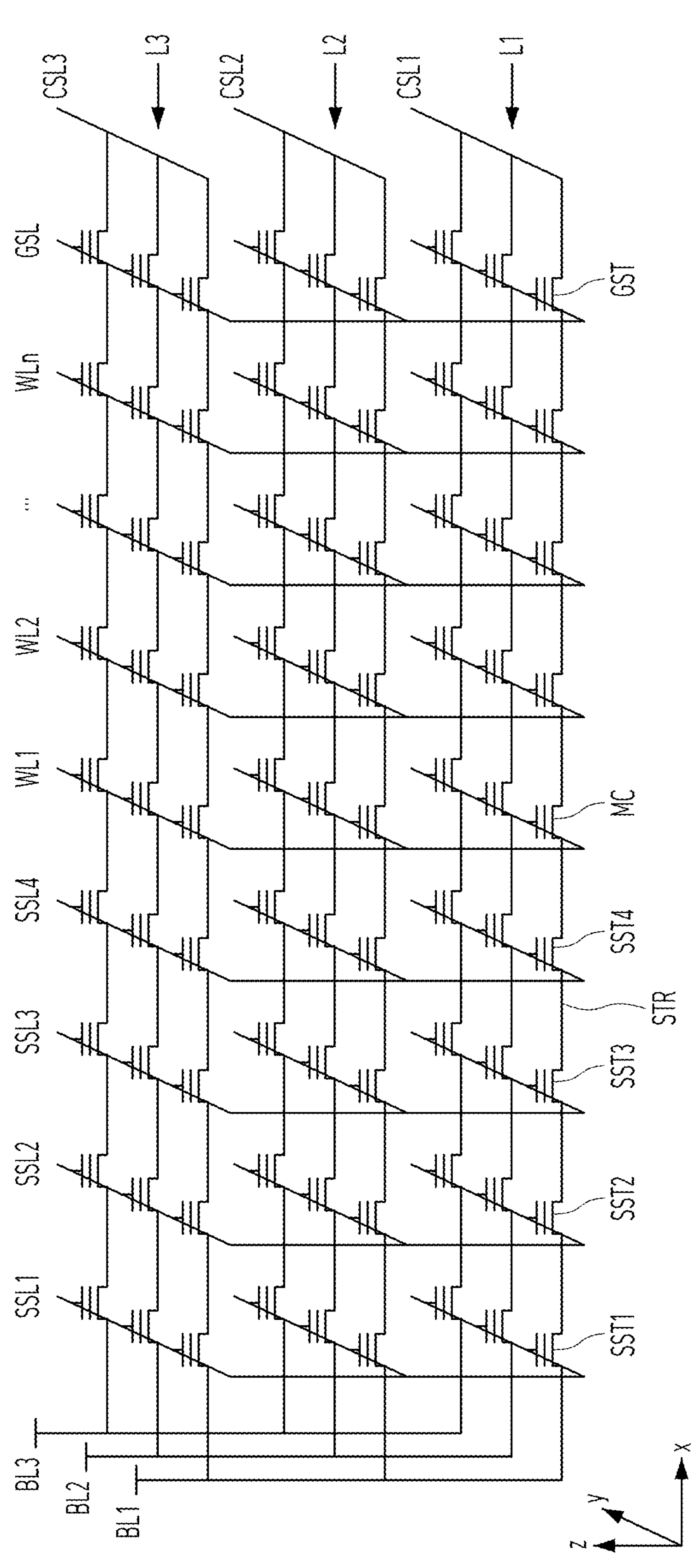
FIG. 5 shows a cell array structure according to an embodiment of the present disclosure.

FIG. 5 shows a cell array structure according to an embodiment of the present disclosure.

Referring to FIGS. 4 and 5, the memory device 150 may be stacked in the vertical direction (D1, Z) through a plurality of stacks ST1, ST2, as described in FIG. 4, and non-volatile memory cells can be placed in three-dimensional (3D) space. Specifically, FIG. 5 illustrates a cell array in a 3D non-volatile memory device according to an embodiment of the present disclosure.

The memory device 150 may include a plurality of memory cells MC arranged in a cell string STR in a plurality of memory layers (e.g., three memory layers L1, L2, L3). Each memory layer L1, L2, L3 is connected to a plurality of bit lines BL1, BL2, BL3 through a first end of the plurality of channel lines CL and to the common source line CSL through a second end of the plurality of channel lines CL. The memory device 150 may include a plurality of source selection lines SSL1 to SSL4 connected to source select transistors SST1 to SST3. In addition, a plurality of word lines WL1 to WLn and a ground selection line GSL may be connected to each of the memory layers L1, L2, L3. The plurality of source selection lines SSL1 to SSL4, the plurality of word lines WL1 to WLn, and the ground selection line GSL may be arranged in a direction that intersects a plurality of channel lines CL. Each of the plurality of channel lines may be described as the cell string STR. Each of the cell strings STR may include the source select transistors SST1 to SST4 respectively connected to the plurality of source selection lines SSL1 to SSL4. The ground selection line GSL may be grounded to turn off the ground selection transistor GST.

The plurality of word lines WL1 to WLn may each be connected to control gates of memory cells arranged in a column direction. Each of the plurality of bit lines BL1 to BL3 may be connected to one end of the source select transistors. A plurality of memory cells having control gate electrodes connected to each word line WL1 to WLn in the row direction can configure a page, which is a unit for storing data or a data entry. The number of pages could be changed or determined depending on a storage capacity of the memory cells.

Figure 6:
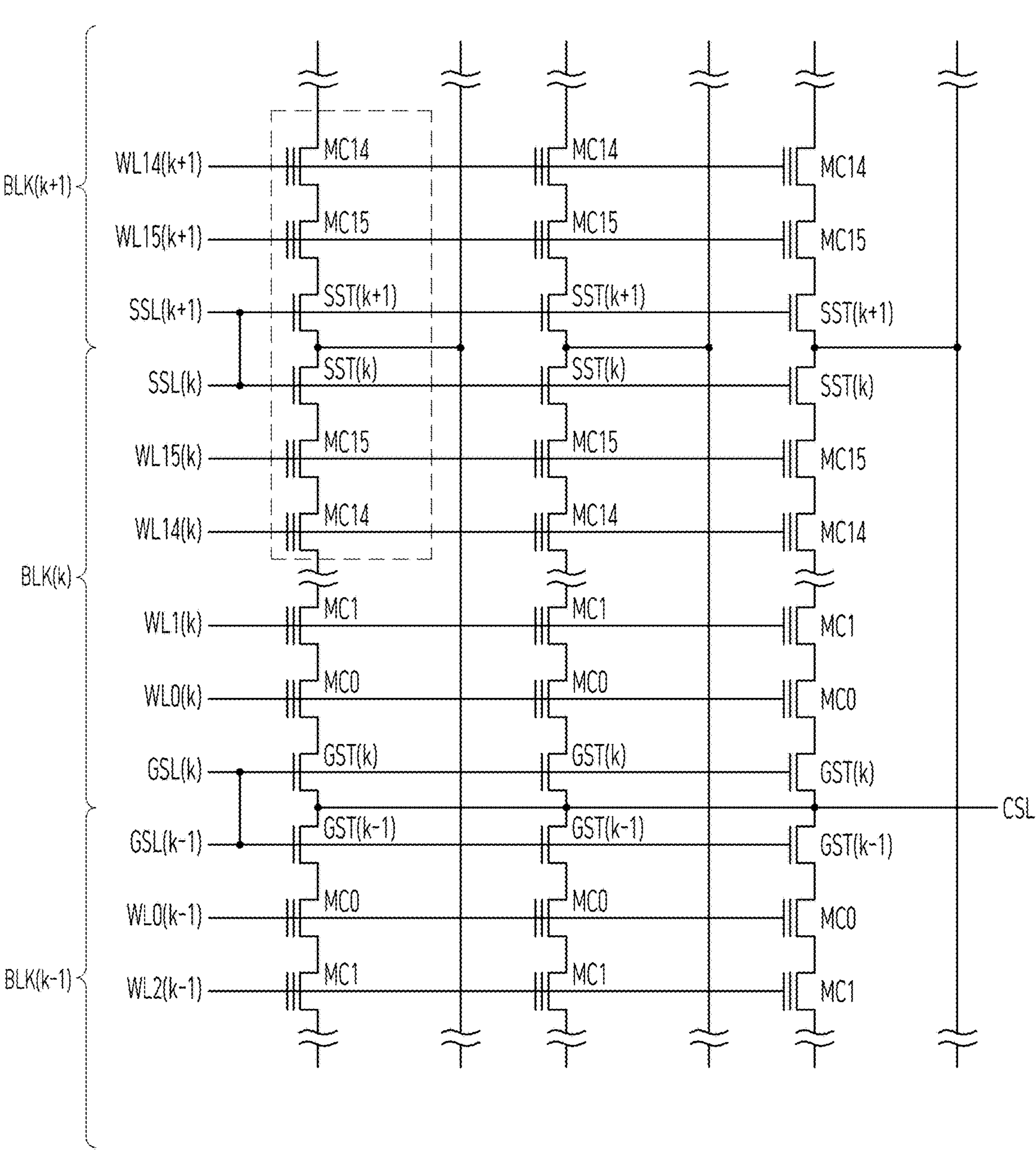
FIG. 6 shows a cell array structure according to an embodiment of the present disclosure.

FIG. 6 shows a cell array structure according to an embodiment of the present disclosure. Specifically, FIG. 6 describes an internal configuration of the cell array 330 described in FIG. 3.

Referring to FIGS. 1 and 6, the cell array 330 within the memory device 150 may include a plurality of memory blocks BLK(k+1), BLK(k), BLK(k−1). FIG. 6 illustrates three memory blocks BLK(k+1), BLK(k), BLK(k−1), but the cell array 330 can include a plurality of memory blocks arranged in two or three dimensions. In FIG. 6, each memory block BLK(k+1), BLK(k), BLK(k−1) has plural memory cells coupled to 16 word lines WL0 to WL15. The 16 word lines WL0 to WL15 and a ground selection line GSL in a direction perpendicular to a row or a bit line could be placed in parallel. However, the number of word lines included in each memory block may vary depending on an embodiment. Each memory block BLK(k+1), BLK(k), BLK(k−1) may include a cell string corresponding to each bit line. In a memory block (e.g., BLK(k)), each cell string may be connected to a source select transistor SST (k) and a ground select transistor GST (k) coupled to the corresponding bit line. The cell string may include 16 memory cells MC15 to MC0 connected in series between a common source line CSL and the string and ground select transistors SST (k), GST (k). The number of memory cells included in the cell string may correspond to the number of word lines. The source select transistor SST (k), the memory cells MC15 to MC0, and the ground select transistor GST (k) are individually connected to a source selection line SSL (k), the word lines WL15 to WL0, and a ground selection line GSL (k).

Referring to FIGS. 1 to 6, as the memory device 150 is designed to store more data, source selection lines of adjacent memory blocks arranged in two or three dimensions may be electrically connected to each other. Further, the ground selection lines for the adjacent memory blocks may be electrically connected to each other. For example, the source selection line SSL (k) of the memory block BLK(k) may be electrically connected to the source selection line SSL (k+1) of the adjacent memory block BLK(k+1). Further, adjacent string/ground select transistors along a bit line can share a contact to achieve electrical connection between adjacent string/ground select lines.

When designed to share a ground selection line or a cell string between adjacent memory blocks, the disturb effect resulting from a read or write operation performed on a specific memory block can affect adjacent memory blocks (e.g., memory blocks with shared cell strings but not selected). Here, a scheme in which cell strings are shared between adjacent memory blocks can include a structure in which cell strings share a same component using an electrode or a functional layer such as any area or any semiconductor layer stacked on the semiconductor substrate or a body electrode disposed in a trench of the semiconductor substrate where the cell strings are disposed. Additionally, when designed to share a ground selection line or a cell string for adjacent memory blocks, the disturb effect due to the read or write operation performed on a specific memory block among the adjacent memory blocks may be greater than a case where the cell string are not shared by the adjacent memory blocks. Because there is a difference in the read disturb effect according to a read operation on an open memory block depending on whether a cell string is shared by adjacent memory blocks of the memory device 150, the memory device 150 can apply different weights in a process of calculating the read count RD_COUNT.

Figures 7, 8:
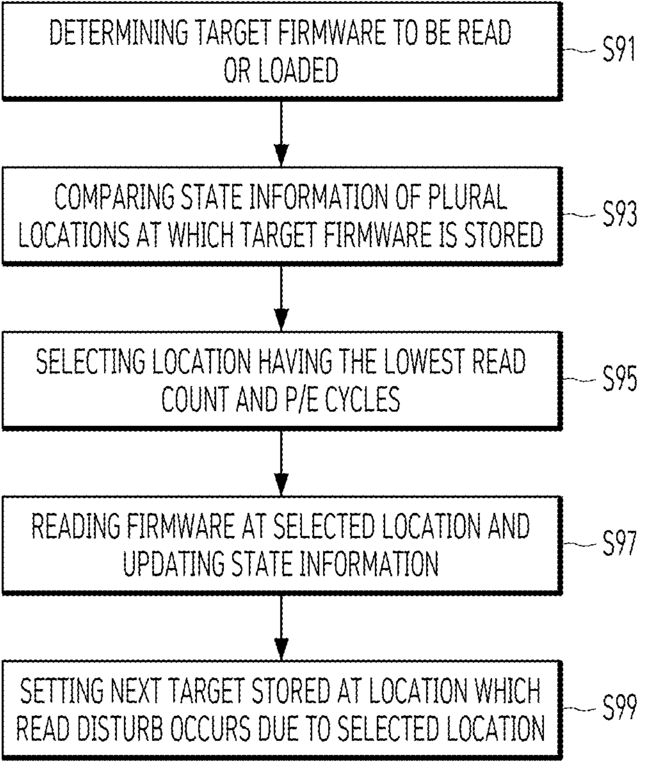
FIG. 7 describes a device for managing state information regarding firmware storage locations according to an embodiment of the present disclosure.
FIG. 8 describes a firmware loading method according to an embodiment of the present disclosure.

FIG. 7 describes a device for managing state information regarding firmware storage locations according to an embodiment of the present disclosure.

Referring to FIG. 7, a firmware management device 330 can generate, maintain, update, or store state information for plural firmware copies FW0, FW1. The plural firmware copies FW0, FW1 can correspond to the plural firmware copies 40_1, 40_2, 40_3, 40_N described in FIG. 1. Corresponding to the design and configuration of the memory system 110 or the memory device 150, a preset number of firmware copies may be stored in the memory device 150.

Each of the plural firmware copies FW0, FW1 can include multiple data entries rather than one data chunk. For example, a first firmware copy FW0 can include first partial firmware FW0_0, second partial firmware FW0_1, and (N+1)th partial firmware FW0_N. The second firmware copy FW1 may include first partial firmware FW1_0 and second partial firmware FW1_1. According to an embodiment, each of the plural firmware copies FW0, FW1 may have a same size, and each of the plural firmware copies FW0, FW1 may include a same number of partial firmware.

According to an embodiment, the memory system 110 may perform an internal operation by loading one firmware among the plural firmware copies FW0, FW1. Additionally, according to an embodiment, the memory system 110 may perform internal operations by loading partial firmware from the plural firmware copies FW0, FW1. For example, the memory system 110 may read and load the first partial firmware from the first firmware copy FW0 and read and load the second partial firmware from the second firmware copy FW1.

According to an embodiment, the number of firmware copies included in the memory device (e.g., N+1 copies) and the number of partial firmware included in each firmware copy (e.g., N+1 parts) may be the same. Additionally, according to an embodiment, the number of firmware copies included in the memory device (e.g., N copies) and the number of partial firmware included in each firmware copy (e.g., K parts) may be different.

According to an embodiment, the firmware management device 330 can generate, maintain, update, or save state information for each partial firmware included in each of the plural firmware copies FW0, FW1 rather than state information for each of the plural firmware copies FW0, FW1. Specifically, the firmware management device 330 can store location information (e.g., BLK #, PL #, PG #) where each partial firmware included in each of the plural firmware copies FW0, FW1 is stored and state information (e.g., RD_C, E/W, St_Info) for each location.

The plural firmware copies FW0, FW1 can be stored in different locations within the memory device 150. Additionally, according to an embodiment, storage locations of partial firmware included in each of the plural firmware copies FW0, FW1 can also vary. Accordingly, the firmware management device 330 can check the location information (e.g., BLK #, PL #, PG #) regarding locations where each partial firmware is stored. The location information can include a memory block number (BLK #), a memory plane number (PL #), or a page number (PG #). The location information for each partial firmware may vary depending on configuration within the memory device 150.

Because the memory system 110 reads or loads partial firmware from the plural firmware copies FW0, FW1, the firmware management device 330 can manage state information for each partial firmware. For example, the state information of the first partial firmware FW0_O and the second partial firmware FW0_1 belonging to the first firmware copy FW0 may be different. Referring to FIG. 7, a read count RD_C of the first partial firmware FW0_O belonging to the first firmware copy FW0 can be 20, while a read count RD_C of the second partial firmware FW0_1 belonging to the first firmware copy FW0 is 1. The firmware management device 330 may determine operational safety of the corresponding partial firmware based on the state information for each partial firmware. Based on the state information, the operational safety of each partial firmware could be judged as Normal (e.g., safe or secure) or Warning (e.g., risky or dangerous). For example, the first partial firmware FW1_0 belonging to the second firmware copy FW1 may have a read count RD_C of 50 and an erase/program cycle (E/W) of 90. The read count RD_C or the erase/program cycle (E/W) regarding the first partial firmware FW1_0 belonging to the second firmware copy FW1 exceeds or approaches a preset standard that can ensure safety. Accordingly, the firmware management device 330 can determine that the operational safety of the first partial firmware FW1_0 belonging to the second firmware copy FW1 is 'Warning.' The firmware management device 330 can copy or move the partial firmware that is determined to be risky or dangerous to another location. Through this procedure, the firmware management device 330 can maintain or improve the operational safety of the plural firmware copies FW0, FW1 included in the memory device 150.

Referring to FIGS. 2 and 7, according to an embodiment, the system area 50_1 and the user data area 50_2 within the memory device 150 can have different standards for determining data safety or operational safety. The system area 50_1 has a stricter standard for determining data safety than the user data area 50_2. For example, in a case of data entry stored in the user data area 50_2, if the read count RD_C exceeds 70, the operational safety may be determined to be at risk (Warning). On the other hand, in a case of data entry stored in the system area 50_1, if the read count RD_C exceeds 40, the operational safety may be judged to be at risk (Warning). Additionally, in the case of data entry stored in the user data area 50_2, if the erase/program cycle (E/W) exceeds 200, the operational safety may be determined to be at risk (Warning). On the other hand, in the case of data entry stored in the system area 50_1, if the erase/program cycle (E/W) exceeds 100, the operational safety may be judged to be at risk (Warning). Thus, in cases of firmware copies stored in the system area 50_1, standards or thresholds for determining an operational safety may be more stringent than standards or thresholds for data entries stored in the user data area 50_2.

FIG. 8 describes a firmware loading method according to an embodiment of the present disclosure.

Referring to FIG. 8, the firmware loading method can include determining target firmware to be read or loaded (operation S91), determining (i.e., checking or comparing) state information of plural locations where the target firmware is stored (operation S93), selecting a location with the lowest read count and/or the lowest P/E cycle (operation S95), reading the target firmware at a selected location, and updating state information regarding the selected location (operation S97). Additionally, depending on the embodiment, the firmware loading method can include setting a location where read disturbance occurs during reading operation at the selected location as a location for a next read target firmware (operation S99).

Referring to FIG. 7, because the number of accesses to the plural firmware copies stored in the memory device 150 and plural partial firmware belonging to the plural firmware copies are different, the memory system 110 can select partial firmware having the lowest value (e.g., the lowest read count, the lowest P/E cycle, or the lowest number of accesses) among the plural partial firmware as the target firmware to be read or loaded. Through this operation, a deviation in state information for the plural firmware copies or the plural partial firmware stored in the memory device 150 could be reduced. For example, through the firmware management device 330, the memory system 110 can check the operating state of the plural firmware copies or the plural partial firmware and determine which of the plural firmware copies or the plural partial firmware (e.g., target firmware) is selected or accessed.

Moreover, as described in FIGS. 3 to 6, the memory device 150 can include a two-dimensional or three-dimensional structure in which a plurality of memory cells are integrated. Thus, it might be difficult to avoid read disturbance occurring in a process of accessing at least one of the plural firmware copies or the plural partial firmware stored in the memory system 110. Read Disturb occurs in a memory cell connected through a same word line or in a memory cell placed adjacent to a memory cell where a read operation is performed. When other firmware copies or other partial firmware are stored in adjacent or neighboring locations, data safety might be deteriorated even though the other firmware copies or the other partial firmware are not a target to be read or loaded (i.e., not target firmware). Therefore, after performing an operation to read a specific firmware copy or specific partial firmware, the memory system 110 can set, as the next read target, another firmware copy or another partial firmware which is stored in the adjacent or neighboring locations where strong read disturb has been caused during the operation of reading the specific firmware copy or the specific partial firmware.

According to an embodiment, in order to estimate read disturb caused by reading a specific location (e.g., a page) within the memory device 150, the memory system 110 or the firmware management device 330 can use several available state information. For example, the read disturb could be understood as one of stresses that can occur during a read operation. The stress occurring during the read operation can be estimated based on the number of program/erase (P/E) cycles. The memory device 150 may have a preset number of program/erase cycles at which performance degradation occurs (e.g., data safety decreases). This may correspond to a lifespan of the memory device 150. Typically, at pages that have more program/erase cycles. more read stress can occur during a read operation due to wear and tear and potential performance degradation of the memory device 150.

According to an embodiment, stress occurring during a read operation can be estimated based on a data retention time. The memory cells in the memory device 150 can stably preserve data for a preset period before a bit error occurs. This can correspond to the operating performance or operating characteristics of the memory device 150. More read stress can occur at pages which firmware copies or partial firmware have been programmed in and have been left unmodified for a long time period, thereby resulting in potential data loss.

According to an embodiment, stress occurring during a read operation can be estimated based on a bit error rate (BER). The bit error rate refers to the likelihood that an error will occur during the read process. Pages with high bit error rates may require additional error correction mechanisms or may experience stronger read stress due to increased error rates.

According to an embodiment, stress occurring during a read operation may be estimated in response to a voltage level applied to the memory cell. The voltage level applied during a read operation may affect stability and stress of a page including a plurality of memory cells in the memory device 150. Higher voltage levels may increase the likelihood of disturbances or other reliability issues and may result in greater read stress in the read page as well as neighboring locations adjacent to the read page.

According to an embodiment, stress occurring during a read operation may occur due to a read disturb effect. Reading a specific page within the memory device 150 may unintentionally affect adjacent pages due to electrical interactions known as read disturb or read disturbance. If a particular page is accessed frequently, adjacent pages may experience increased stress compared to other pages far away from the particular page. Here, the adjacent pages can be recognized based on a physical distance therebetween or a component where electrical interaction can occur, such as a same word line or a same bit line.

The memory system 110 or the firmware management device 330 may estimate whether a specific page has a higher read stress or a greater read disturb effect than other pages, based on operation state information. To this end, the memory system 110 or the firmware management device 330 can check program/erase cycles, a data retention time, a bit error rate, voltage levels applied during read operations, and components that may cause certain effects such as read disruption. Based on the information, a relative stress difference between multiple pages or memory blocks in the memory device 150 could be estimated.

Figures 9, 10:
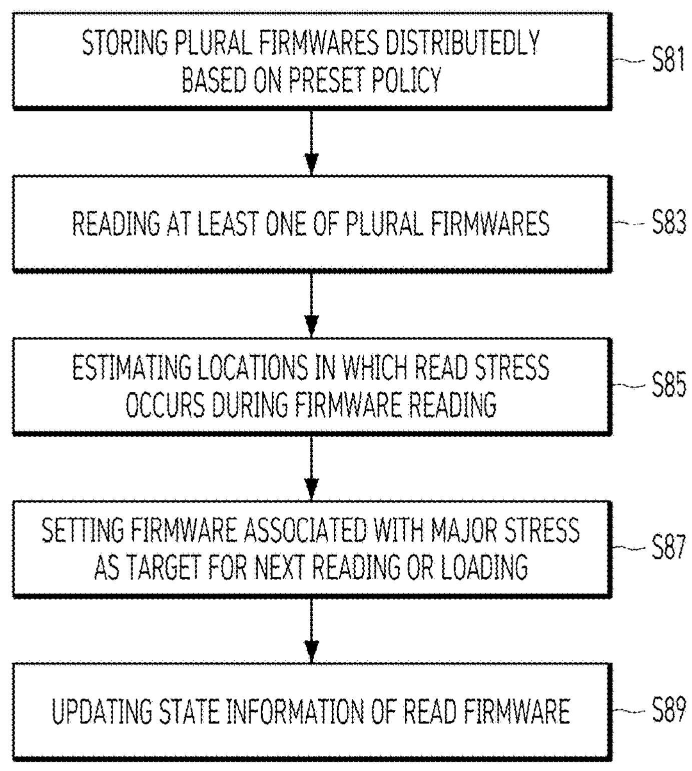
FIG. 9 describes a firmware access method according to an embodiment of the present disclosure.
FIG. 10 describes a firmware loading method according to an embodiment of the present disclosure.

FIG. 9 describes a firmware access method according to an embodiment of the present disclosure. Here, the firmware access method shows how to determine a next read target firmware based on read disturb.

Specifically, FIG. 9 illustrates a case where plural firmware are stored in neighboring locations within the memory device 150 as an example. For example, a first firmware fw0 may be stored in first pages Page0 included in first to fourth memory planes Plane0, Plane1, Plane2, Plane3. A second firmware fw1 may be stored in second pages Page1 included in the first to fourth memory planes Plane0, Plane1, Plane2, Plane3. A third firmware fw2 to an eighth firmware fw7 are sequentially stored in third pages Page2 to eighth pages fw7 included in the first to fourth memory planes Plane0, Plane1, Plane2, Plane3.

The memory system 110 may perform read operations on the first firmware fw0 to the eighth firmware fw7 in the memory device 150. In order to alleviate increase in read disturb or stress that may occur during the read operations at a specific location, the memory system 110 does not read the first firmware fw0 to the eighth firmware fw7 stored in a same memory plane. The memory system 110 can read the first firmware fw0 to the eighth firmware fw7 from all of the first to fourth memory planes Plane0, Plane1, Plane2, Plane3. For example, after reading the first firmware fw0 stored in the first page Page0 of the first memory plane Plane0 (①), the memory system 110 can read the second firmware fw1 stored in the second page Page1 of the second memory plane Plane1 (②), not the first memory plane Plane0. After reading the third firmware fw2 stored in the third page Page2 of the third memory plane Plane2 (③), the memory system 110 can read the fourth firmware fw3 stored in the fourth page Page3 of the fourth memory plane Plane3 (④). The memory system 110 can sequentially read the fifth firmware fw4 to the eighth firmware fw7 from each of the first to fourth memory planes Plane0, Plane1, Plane2, Plane3 (⑤, ⑥, ⑦, ⑧). Through this scheme or mechanism, the read operations for the first firmware fw0 to the eighth firmware fw7 can be sequentially and evenly performed in all of the first to fourth memory planes Plane0, Plane1, Plane2, Plane3.

During the first read operation (①) for the first firmware fw0 stored in the first page Page0 of the first memory plane Plane0, read stress or read disturb may occur in the first pages Page0 of other memory planes connected through a same word line, that is, the second to fourth memory planes Plane1, Plane2, Plane3. Referring to FIG. 9, while reading the first firmware fw0 stored in the first page Page0 of the first memory plane Plane0, read stress or read disturb (indicated by a pattern) may occur in the first pages Page0 of the second to fourth memory planes Plane1, Plane2, and Plane3. Similarly, during the second read operation (②) for the second firmware fw1 stored in the second page Page1 of the second memory plane Plane1, read stress or read disturb (indicated by a pattern) may occur in the second pages Page1 of the first, third to fourth memory planes Plane0, Plane2, Plane3, that is, other memory planes connected through a same word line. Depending on the embodiment, read stress or read disturb may be proportional to a distance from a location of the memory cell being accessed. Based on estimated read stress or read disturb, the memory system 110 can select or determine next read targets (e.g., next access locations) regarding the first firmware fw0 to the eighth firmware fw7.

For example, during the first read operation (①) for the first firmware fw0 stored in the first page Page0 of the first memory plane Plane0, the largest read disturb may occur in the first page Page0 of the second memory plane Plane1 due to the nearest distance when there is no big difference in operation state information. Accordingly, the memory system 110 may select or determine the next read target (ⓐ) for the first firmware fw0, which is stored in the first page Page0 of the second memory plane Plane1. Likewise, during the second read operation (②) for the second firmware fw1 stored in the second page Page1 of the second memory plane Plane1, the largest read disturb may occur in the second pages Page1 of the first or third memory plane Plane0, Plane2. Accordingly, the memory system 110 may select or determine the next read target (ⓑ) for the second firmware fw1, which is stored in the second page Page1 of the first or third memory plane Plane0, Plane2. In FIG. 9, the second firmware fw1 stored in the second page Page1 of the third memory plane Plane2 is selected or determined as the next read target (ⓑ).

Referring to FIG. 9, in response to the read stress or the read disturb that occurred during the read operations (① to ⑧) for the first firmware fw0 to the eighth firmware fw7, the next read target (ⓐ, ⓑ, ⓒ, ⓔ, ⓕ, ⓖ, ⓑ) can be set to the first firmware fw0 to the eighth firmware fw7 stored in the adjacent memory planes. FIG. 9 illustrates the case where a same firmware is stored in a same page included in the first to fourth memory planes Plane0, Plane1, Plane2, Plane3 as an example, but depending on the embodiment, the same firmware is not stored in the same page. Even in this case, the memory system 110 can assign a priority as the next read target to a position where largest read disturb is most likely to occur during a process of reading specific firmware.

In addition, according to an embodiment, the read operations for the first firmware fw0 to the eighth firmware fw7 described in FIG. 9 can be applied to read operations corresponding to the plural firmware copies FW0, FW1 or the plural partial firmware including the first partial firmware FW0_0, the second partial firmware FW0_1, and the (N+1)th partial firmware FW0_N, which are described in FIG. 7.

FIG. 10 describes a firmware loading method according to an embodiment of the present disclosure.

Referring to FIG. 10, the firmware loading method can include storing plural firmware distributedly based on a preset policy (operation S81), reading at least one of the plural firmware distributedly stored (operation S83), estimating locations in which read stress occurs while reading the firmware (operation S85), setting firmware associated with major stress (i.e., stored at a location with high estimated stress) as a target of the next reading or loading operation (operation S87), and updating state information of the read firmware (operation S89).

The memory system 110 can distribute and store the plural firmware in the memory device 150 (the operation S81). As described in FIG. 9, the plural firmware may be distributed and stored in plural memory cells connected to a same word line but included in different memory planes. According to an embodiment, depending on the configuration of the memory device 150, the plural firmware may be distributed and stored within a same word line, a same bit line, a same memory block, or a same memory plane. Further, locations where the plural firmware are stored may vary depending on the number of firmware stored in the memory device 150.

The memory system 110 may read firmware stored in the memory device 150 when power is supplied or before a specific internal operation is performed (the operation S83). The memory system 110 may store or load firmware read from the memory device 150 in a buffer or operating memory. The memory system 110 may not maintain firmware in the buffer or operating memory for a long time, depending on a size of the buffer or operating memory or characteristics of the loaded firmware. When the firmware is not continuously maintained in the buffer or operating memory, the memory system 110 can read or load a same firmware from the memory device 150 multiple times, as described in FIG. 9.

The memory system 110 can estimate a location of read stress occurring while reading firmware (the operation S85). Further, a level of stress or read disturb occurring during a read operation can be estimated based on the state information or the above-described method. Thereafter, the memory system 110 can determine firmware stored at the location where the estimated stress is larger or largest as a target of the next read operation (the operation S87).

Afterwards, the memory system 110 can update the state information associated with the read or loaded firmware (the operation S89). As described in FIG. 7, the firmware management device 330 can update and store the state information of the firmware based on the location information of the firmware. Here, the state information can include a read count RD_C, erase/program cycles (E/W Cycles), safety information St_Info, and the like.

Figure 11:
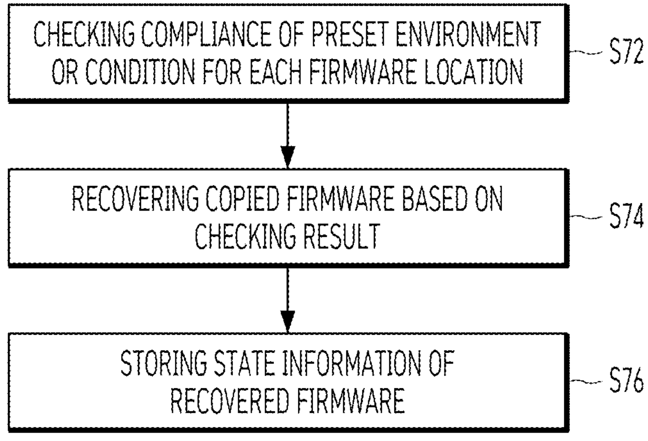
FIG. 11 describes a firmware management method according to an embodiment of the present disclosure.

FIG. 11 describes a firmware management method according to an embodiment of the present disclosure.

Referring to FIG. 11, the firmware management method can include checking compliance of a present environment or operating condition for each firmware location (e.g., whether the preset usage environment or operating conditions are met for each firmware location) (operation S72), recovering or restoring copied firmware or a memory block storing the firmware based on a checking result (operation S74), and storing state information associated with restored firmware (operation S76).

Referring to FIGS. 7 and 11, the memory system 110 or the firmware management device 330 can determine safety information St_Info based on a result of determining (i.e., checking or comparing) a read count RD_C and/or erase/program cycles (E/W Cycles), which is a type of state information regarding a firmware copy or partial firmware, with a preset standard or threshold (the operation S72). If the safety information regarding the firmware copy or the partial firmware at a current location is determined to be at risk (Warning), the memory system 110 or the firmware management device 330 may copy or move the firmware copy or the partial firmware to another location (the operation S74). Thereafter, the memory system 110 or the firmware management device 330 can update the state information of the firmware copy or the partial firmware based on a copied or moved location of the firmware copy or the partial firmware (the operation S76). This firmware management method might be similar to garbage collection, wear leveling, data migration, or a read retry operation performed in the memory system 110. However, because this operation is performed on firmware rather than user data, standards or thresholds regarding operating states for the firmware or conditions for determining a location where risky firmware is copied or moved to could be set to ensure higher operation safety than the user data.

Figure 12:
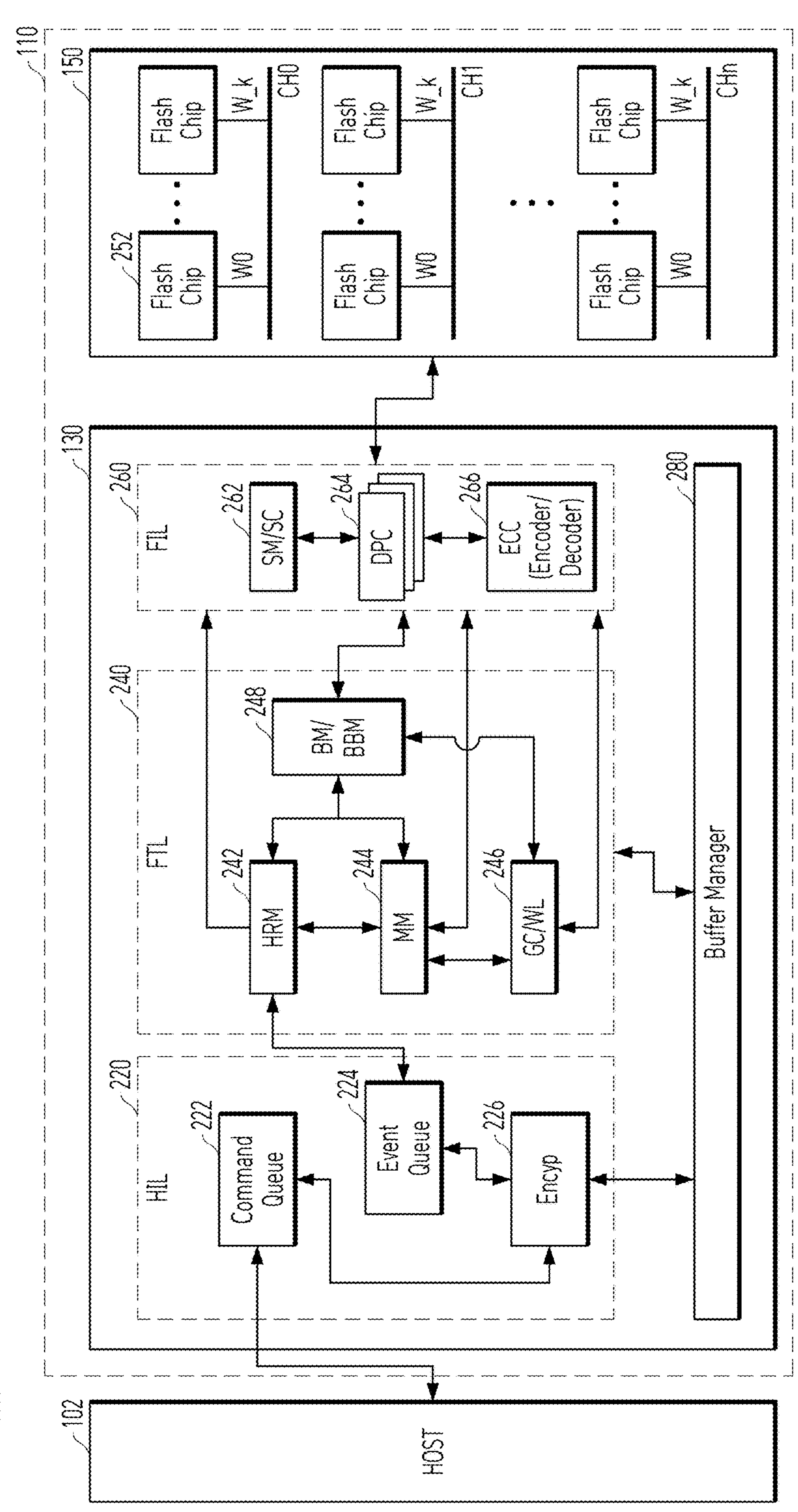
FIG. 12 illustrates a memory system according to another embodiment of the present disclosure.

FIG. 12 illustrates a data processing system according to an embodiment of the present disclosure.

Referring to FIG. 12, the data processing system 100 may include a host 102 engaged or coupled with a memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

The memory device 150 can include plural memory chips (e.g., flash chips) 252 coupled to the controller 130 through plural channels CH0, CH1, . . . , CHn and ways W0, . . . , W_k. The memory chip 252 can include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells. Each memory plane or each memory die can support an interleaving mode in which plural data input/output operations are performed in parallel or simultaneously. According to an embodiment, memory blocks included in each memory plane, or each memory die, included in the memory device 150 can be grouped to input/output plural data entries as a super memory block. An internal configuration of the memory device 150 shown in FIG. 12 may be changed based on operating performance of the memory system 110. An embodiment of the present disclosure may not be limited to the internal configuration described in FIG. 12.

According to an embodiment, the memory device 150 and the controller 130 may be components or elements functionally divided. Further, according to an embodiment, the memory device 150 and the controller 130 may be implemented with a single chip or a plurality of chips.

The controller 130 may perform a data input/output operation (such as a read operation, a program operation, an erase operation, etc.) in response to a request or a command input from an external device such as the host 102. For example, when the controller 130 performs a read operation in response to a read request input from an external device, data stored in a plurality of non-volatile memory cells included in the memory device 150 is transferred to the controller 130. Further, the controller 130 can independently perform an operation regardless of the request or the command input from the host 102. Regarding an operating state of the memory device 150, the controller 130 can perform an operation such as garbage collection (GC), wear leveling (WL), a bad block management (BBM) for checking whether a memory block is bad and handling a bad block.

Each memory chip 252 can include a plurality of memory blocks. The memory blocks may be understood to be a group of non-volatile memory cells in which data is removed together by a single erase operation. Although not illustrated, the memory block may include a page which is a group of non-volatile memory cells that store data together during a single program operation or output data together during a single read operation. For example, one memory block may include a plurality of pages. The memory device 150 may include a voltage supply circuit capable of supplying at least one voltage into the memory block. The voltage supply circuit may supply a read voltage Vrd, a program voltage Vprog, a pass voltage Vpass, or an erase voltage Vers into a non-volatile memory cell included in the memory block.

The host 102 interworking with the memory system 110, or the data processing system 110 including the memory system 110 and the host 102, is a mobility electronic device (such as a vehicle), a portable electronic device (such as a mobile phone, an MP3 player, a laptop computer, or the like), and a non-portable electronic device (such as a desktop computer, a game machine, a TV, a projector, or the like). The host 102 may provide interaction between the host 102 and a user using the data processing system 100 or the memory system 110 through at least one operating system (OS). The host 102 transmits a plurality of commands corresponding to a user's request to the memory system 110, and the memory system 110 performs data input/output operations corresponding to the plurality of commands (e.g., operations corresponding to the user's request).

Referring to FIG. 12, the controller 130 in a memory system operates along with the host 102 and the memory device 150. As illustrated, the controller 130 may include a layered structure including the host interface layer (HIL) 220, a flash translation layer (FTL) 240, and a flash interface layer (FIL, or a memory interface layer) 260.

The host interface layer (HIL) 220, the flash translation layer (FTL) 240, and the flash interface layer (FIL) 260 described in FIG. 12 are illustrated as one embodiment. The host interface layer (HIL) 220, the flash translation layer (FTL) 240, and the flash interface layer (FIL) 260 may be implemented in various forms according to the operating performance of the memory system 110. According to an embodiment, the host interface layer (HIL) 220, the flash translation layer (FTL) 240, and the flash interface layer (FIL) 260 can perform operations through multi cores or processors having a pipelined structure included in the controller 130.

The host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 102 and the memory system 110 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

The memory system 110 may support the non-volatile memory express (NVMe). The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second. According to an embodiment, the PCIe scheme may achieve bandwidths of tens to hundreds of Giga bits per second.

A buffer manager 280 included in the controller 130 can control the input/output of data or operation information in conjunction with the host interface layer (HIL) 220, the flash translation layer (FTL) 240, and the flash interface layer (FIL) 260. To this end, the buffer manager 280 can set or establish various buffers, caches, or queues in a memory, and control data input/output of the buffers, the caches, or the queues, or data transmission between the buffers, the caches, or the queues in response to a request or a command generated by the host interface layer (HIL) 220, the flash translation layer (FTL) 240, and the flash interface layer (FIL) 260. For example, the controller 130 may temporarily store read data provided from the memory device 150 in response to a request from the host 102 before providing the read data to the host 102. Also, the controller 130 may temporarily store write data provided from the host 102 in a memory before storing the write data in the memory device 150. When controlling operations such as a read operation, a program operation, and an erase operation performed within the memory device 150, the read data or the write data transmitted or generated between the controller 130 and the memory device 150 in the memory system 110 could be stored and managed in a buffer, a queue, etc. established in the memory by the buffer manager 280. Besides the read data or the write data, the buffer manager 280 can store signal or information (e.g., map data, a read command, a program command, or etc. which is used for performing operations such as programming and reading data between the host 102 and the memory device 150) in the buffer, the cache, the queue, etc. established in the memory. The buffer manager 280 can set, or manage, a command queue, a program memory, a data memory, a write buffer/cache, a read buffer/cache, a data buffer/cache, a map buffer/cache, and etc.

The host interface layer (HIL) 220 may handle commands, data, and the like transmitted from the host 102. By way of example but not limitation, the host interface layer 220 may include a command queue manager 222 and an event queue manager 224. The command queue manager 222 may sequentially store the commands, the data, and the like received from the host 102 in a command queue, and output them to the event queue manager 224, for example, in an order in which they are stored in the command queue manager 222. The event queue manager 224 may sequentially transmit events for processing the commands, the data, and the like received from the command queue. According to an embodiment, the event queue manager 224 may classify, manage, or adjust the commands, the data, and the like received from the command queue. Further, according to an embodiment, the host interface layer 220 can include an encryption manager (Encyp) 226 configured to encrypt a response or output data to be transmitted to the host 102 or to decrypt an encrypted portion in the command or data transmitted from the host 102.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or commands for reading data, i.e., a read command, and a command for programming/writing data, i.e., a write command, may be alternately transmitted to the memory system 110. The command queue manager 222 of the host interface layer 220 may sequentially store commands, data, and the like, which are transmitted from the host 102, in the command queue. Thereafter, the host interface layer 220 may estimate or predict what type of internal operations the controller 130 will perform according to the characteristics of the commands, the data, and the like, which have been transmitted from the host 102. The host interface layer 220 may determine a processing order and a priority of commands, data and the like based on their characteristics. According to the characteristics of the commands, the data, and the like transmitted from the host 102, the event queue manager 224 in the host interface layer 220 is configured to receive an event, which should be processed or handled internally within the memory system 110 or the controller 130 according to the commands, the data, and the like input from the host 102, from the buffer manager 280. Then, the event queue manager 224 can transfer the event including the commands, the data, and the like into the flash translation layer (FTL) 240.

According to an embodiment, the flash translation layer (FTL) 240 may include a host request manager (HRM) 242, a map manager (MM) 244, a state manager (GL/WL) 246, and a block manager BM/BBM) 248. Further, according to an embodiment, the flash translation layer (FTL) 240 may implement a multi-thread scheme to perform data input/output (I/O) operations. A multi-thread FTL may be implemented through a multi-core processor using multi-thread included in the controller 130. For example, the host request manager (HRM) 242 may manage the events transmitted from the event queue. The map manager (MM) 244 may handle or control map data. The state manager 246 may perform an operation such as garbage collection (GC) or wear leveling (WL), after checking an operating state of the memory device 150. The block manager 248 may execute commands or instructions onto a block in the memory device 150.

The host request manager (HRM) 242 may use the map manager (MM) 244 and the block manager 248 to handle or process requests according to read and program commands and events which are delivered from the host interface layer 220. The host request manager (HRM) 242 may send an inquiry request to the map manager (MM) 244 to determine a physical address corresponding to a logical address which is entered with the events. The host request manager (HRM) 242 may send a read request with the physical address to the flash interface layer 260 to process the read request, i.e., handle the events. In one embodiment, the host request manager (HRM) 242 may send a program request (or a write request) to the block manager 248 to program data to a specific empty page storing no data in the memory device 150, and then may transmit a map update request corresponding to the program request to the map manager (MM) 244 in order to update an item relevant to the programmed data in information of mapping the logical and physical addresses to each other.

The block manager 248 may convert a program request delivered from the host request manager (HRM) 242, the map manager (MM) 244, and/or the state manager 246 into a flash program request used for the memory device 150, to manage flash blocks in the memory device 150. To maximize or enhance program or write performance of the memory system 110, the block manager 248 may collect program requests and send flash program requests for multiple-plane and one-shot program operations to the flash interface layer 260. In an embodiment, the block manager 248 sends several flash program requests to the flash interface layer 260 to enhance or maximize parallel processing of a multi-channel and multi-directional flash controller.

In an embodiment, the block manager 248 may manage blocks in the memory device 150 according to the number of valid pages, select and erase blocks having no valid pages when a free block is needed and select a block including the least number of valid pages when it is determined that garbage collection is to be performed. The state manager 246 may perform garbage collection to move valid data stored in the selected block to an empty block and erase data stored in the selected block so that the memory device 150 may have enough free blocks (i.e., empty blocks with no data).

When the block manager 248 provides information regarding a block to be erased to the state manager 246, the state manager 246 may check all flash pages of the block to be erased to determine whether each page of the block is valid. For example, to determine validity of each page, the state manager 246 may identify a logical address recorded in an out-of-band (OOB) area of each page. To determine whether each page is valid, the state manager 246 may compare a physical address of the page with a physical address mapped to a logical address obtained from an inquiry request. The state manager 246 sends a program request to the block manager 248 for each valid page. A map table may be updated by the map manager 244 when a program operation is complete.

The map manager 244 may manage map data, e.g., a logical-physical map table. The map manager 244 may process various requests, for example, queries, updates, and the like, which are generated by the host request manager (HRM) 242 or the state manager 246. The map manager 244 may store the entire map table in the memory device 150, e.g., a flash/non-volatile memory, and cache mapping entries according to the storage capacity of the memory 144. When a map cache miss occurs while processing inquiry or update requests, the map manager 244 may send a read request to the flash interface layer 260 to load a relevant map table stored in the memory device 150. When the number of dirty cache blocks in the map manager 244 exceeds a certain threshold value, a program request may be sent to the block manager 246, so that a clean cache block is made and a dirty map table may be stored in the memory device 150.

When garbage collection is performed, the state manager 246 copies valid page(s) into a free block, and the host request manager (HRM) 242 may program the latest version of the data for the same logical address of the page and concurrently issue an update request. When the state manager 246 requests the map update in a state in which the copying of the valid page(s) is not completed normally, the map manager 244 may not perform the map table update. This is because the map request is issued with old physical information when the state manger 246 requests a map update and a valid page copy is completed later. The map manager 244 may perform a map update operation to ensure accuracy when, or only if, the latest map table still points to the old physical address.

The flash interface layer (FIL) 260 may exchange data, commands, state information, and the like, with a plurality of memory chips 252 in the memory device 150 through a data communication method. According to an embodiment, the flash interface layer 260 may include a status check schedule manager (SM/SC) 262 and a data path manager (DPC) 264. The status check schedule manager 262 can check and determine the operating state regarding the plurality of memory chips 252 coupled to the controller 130, the operating state regarding a plurality of channels CH0, CH1, . . . , CHn and the plurality of ways W0, . . . , W_k, and the like. The transmission and reception of data or commands can be scheduled in response to the operating states regarding the plurality of memory chips 252 and the plurality of channels CH0, CH1, . . . , CHn. The data path manager 264 can control the transmission and reception of data, commands, etc. through the plurality of channels CH0, CH1, . . . , CHn and ways W0, . . . , W_k based on the information transmitted from the status check schedule manager 262. According to an embodiment, the data path manager 264 may include a plurality of transceivers, each transceiver corresponding to each of the plurality of channels CH0, CH1, . . . , CHn. Further, according to an embodiment, the status check schedule manager 262 and the data path manager 264 included in the flash interface layer 260 could be implemented as, or engaged with, a memory control sequence generator.

According to an embodiment, the flash interface layer 260 may further include an ECC (error correction code) circuitry 266 configured to perform error checking and correction of data transferred between the controller 130 and the memory device 150. The ECC circuitry 266 may be implemented as a separate module, circuit, or firmware in the controller 130, but may also be implemented in each memory chip 252 included in the memory device 150 according to an embodiment. The ECC circuitry 266 may include a program, a circuit, a module, a system, or an apparatus for detecting and correcting an error bit of data processed by the memory device 150.

For finding and correcting any error of data transferred from the memory device 150, the ECC circuitry 266 can include an error correction code (ECC) encoder and an ECC decoder. The ECC encoder may perform error correction encoding of data to be programmed in the memory device 150 to generate encoded data into which a parity bit is added and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the ECC circuitry 266 can determine whether the error correction decoding has succeeded or not, and outputs an instruction signal, e.g., a correction success signal or a correction fail signal, based on a result of the error correction decoding. The ECC circuitry 266 may use a parity bit, which has been generated during the ECC encoding process for the data stored in the memory device 150, to correct the error bits of the read data entries. When the number of the error bits is greater than or equal to the number of correctable error bits, the ECC circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above-described codes.

For example, the encoder in the ECC circuitry 266 may generate a codeword that is a unit of ECC-applied data. A codeword of length n bits may include k bits of user data and (n-k) bits of parity. A code rate may be calculated as (k/n). The higher the code rate, the more user data that can be stored in a given codeword. When the length of the codeword is longer and the code rate is smaller, the error correction capability of the ECC circuitry 266 could be improved. In addition, the ECC circuitry 266 performs decoding using information read from the channels CH0, CH1, . . . , CHn. The decoder in the ECC circuitry 266 can be classified into a hard decision decoder and a soft decision decoder according to how many bits represent the information to be decoded. A hard decision decoder performs decoding with a memory cell output information expressed in 1 bit, and the 1-bit information used at this time is called hard decision information. A soft decision decoder uses more accurate memory cell output information composed of 2 bits or more, and this information is called soft decision information. The ECC circuitry 266 may correct errors included in data using the hard decision information or the soft decision information.

According to an embodiment, to increase the error correction capability, the ECC circuitry 266 may use a concatenated code using two or more codes. In addition, the ECC circuitry 266 may use a product code that divides one codeword into several rows and columns and applies a different relatively short ECC to each row and column.

In accordance with an embodiment, a manager included in the host interface layer 220, the flash translation layer (FTL) 240, and the flash interface layer (FIL) 260 could be implemented with a general processor, an accelerator, a dedicated processor, a co-processor, a multi-core processor, or the like. According to an embodiment, the manager can be implemented with firmware working with a processor.

According to an embodiment, the memory device 150 is embodied as a non-volatile memory such as a flash memory, for example, a Read Only Memory (ROM), a Mask ROM (MROM), a Programmable ROM (PROM), an Erasable ROM (EPROM), an Electrically Erasable ROM (EEPROM), a Magnetic (MRAM), a NAND flash memory, a NOR flash memory, or the like. In another embodiment, the memory device 150 may be implemented by at least one of a phase change random access memory (PCRAM), a Resistive Random Access Memory (ReRAM), a ferroelectrics random access memory (FRAM), a transfer torque random access memory (STT-RAM), and a spin transfer torque magnetic random access memory (STT-MRAM), or the like.

According to an embodiment, the memory system 110 may support dividing a storage area in which data entries are stored in the memory device 150 based on a preset standard and dedicating each of divided areas to a specific range of logical block addresses (LBA). When supporting zoned namespaces, the memory system 110 can increase access efficiency and reduce an access time by using a logical block address range dedicated for each area rather than using a specific logical block address range that spans multiple areas. For example, zoned namespaces can improve write performance, which can be useful for workloads that require sequential writes of large amounts of data, such as video streaming or data backup.

Figure 13:
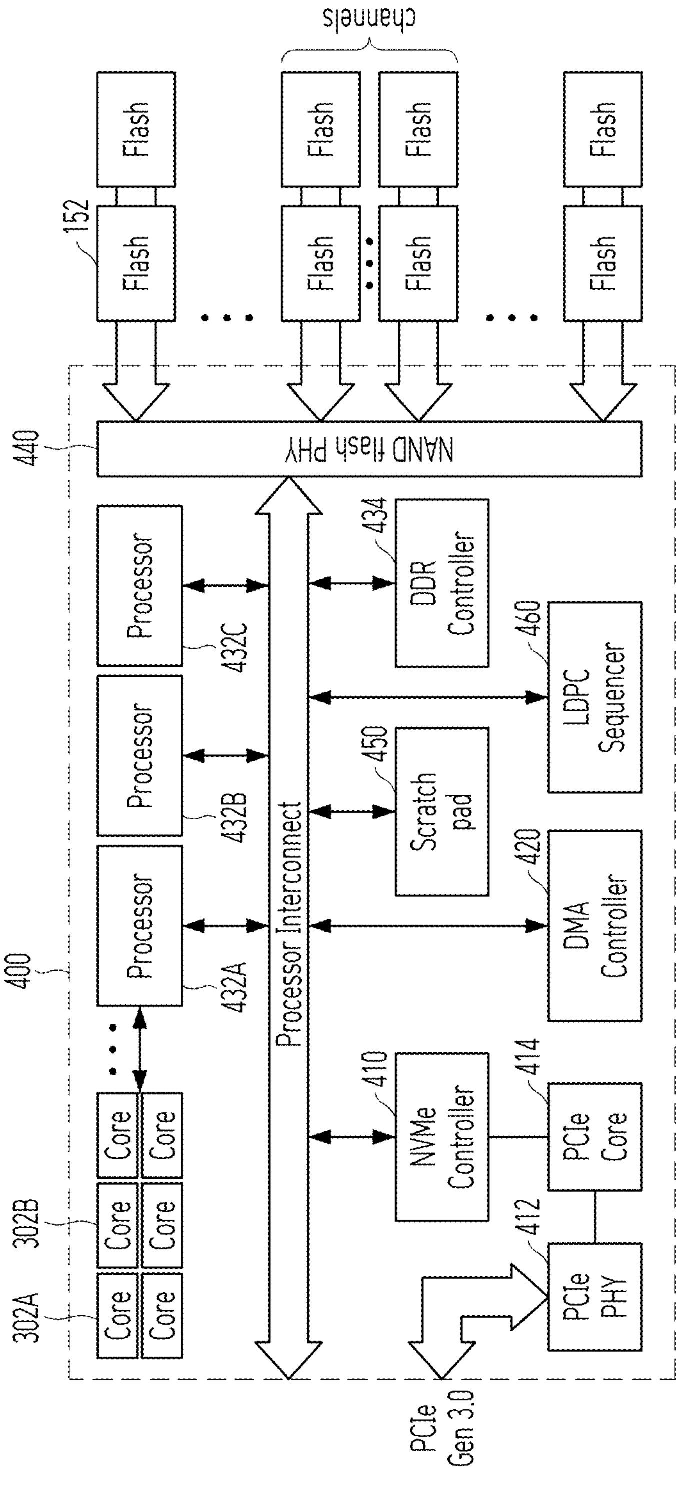
FIG. 13 illustrates a memory system according to another embodiment of the present disclosure.

FIG. 13 illustrates a data storage system according to an embodiment of the present disclosure. FIG. 13 shows a memory system including multiple cores or multiple processors, which is an example of a data storage system. The memory system may support the Non-Volatile Memory Express (NVMe) protocol.

The NVMe is a type of transfer protocol designed for a solid-state memory that could operate much faster than a conventional hard drive. The NVMe can support higher input/output operations per second (IOPS) and lower latency, resulting in faster data transfer speeds and improved overall performance of the data storage system. Unlike SATA which has been designed for a hard drive, the NVMe can leverage the parallelism of solid-state storage to enable more efficient use of multiple queues and processors (e.g., CPUs). The NVMe is designed to allow hosts to use many threads to achieve higher bandwidth. The NVMe can allow the full level of parallelism offered by SSDs to be fully exploited. However, because of limited firmware scalability, limited computational power, and high hardware contention within SSDs, the memory system might not process a large number of I/O requests in parallel.

Referring to FIG. 13, the host, which is an external device, can be coupled to the memory system through a plurality of PCIe Gen 3.0 lanes, a PCIe physical layer 412, and a PCIe core 414. A controller 400 may include three embedded processors 432A, 432B, 432C, each using a plurality of cores 302A, 302B. Herein, the plurality of cores 302A, 302B or the plurality of embedded processors 432A, 432B, 432C may have a pipeline structure.

The plurality of embedded processors 432A, 432B, 432C may be coupled to an internal DRAM controller (DDR controller) 434 through a processor interconnect. The controller 400 further includes a Low Density Parity-Check (LDPC) sequencer 460, a Direct Memory Access (DMA) engine 420, a scratch pad memory 450 for metadata management, and an NVMe controller 410. Components within the controller 400 may be coupled to a plurality of channels connected to a plurality of memory packages (Flash) 152 through a flash physical layer (NAND flash PHY) 440. The plurality of memory packages 152 may correspond to the plurality of memory chips 252 described in FIG. 12.

According to an embodiment, the NVMe controller 410 included in the controller 400 is a type of storage controller designed for use with solid state drives (SSDs) that use an NVMe interface. The NVMe controller 410 may manage data transfer between the SSD and the computer CPU as well as other functions such as error correction, wear leveling, and power management. The NVMe controller 410 may use a simplified, low-overhead protocol to support fast data transfer rates.

According to an embodiment, a scratch pad memory 450 may be a storage area set by the NVMe controller 410 to temporarily store data. The scratch pad memory 450 may be used to store data waiting to be written to a plurality of memory packages 152. The scratch pad memory 450 can also be used as a buffer to speed up the writing process, typically with a small amount of Dynamic Random Access Memory (DRAM) or Static Random Access Memory (SRAM). When a write command is executed, data may first be written to the scratch pad memory 450 and then transferred to the plurality of memory packages 152 in larger blocks. The scratch pad memory 450 may be used as a temporary memory buffer to help optimize the write performance of the plurality of memory packages 152. The scratch pad memory 450 may serve as intermediate storage of data before the data is written to non-volatile memory cells.

The Direct Memory Access (DMA) engine 420 included in the controller 400 is a component that transfers data between the NVMe controller 410 and a host memory in the host system without involving a host's processor. The DMA engine 420 can support the NVMe controller 410 to directly read or write data from or to the host memory without intervention of the host's processor. According to an embodiment, the DMA engine 420 may achieve or support high-speed data transfer between a host and an NVMe device, using a DMA descriptor that includes information regarding data transfer such as a buffer address, a transfer length, and other control information.

The LDPC sequencer 460 in the controller 400 is a component that performs error correction on data stored in the plurality of memory packages 152. Herein, an LDPC code is a type of error correction code commonly used in a NAND flash memory to reduce a bit error rate. The LDPC sequencer 460 may be designed to immediately process encoding and decoding of LDPC codes when reading and writing data from and to the NAND flash memory. According to an embodiment, the LDPC sequencer 460 may divide data into plural blocks, encode each block using an LDPC code, and store the encoded data in the plurality of memory packages 152. Thereafter, when reading the encoded data from the plurality of memory packages 152, the LDPC sequencer 460 can decode the encoded data based on the LDPC code and correct errors that may have occurred during a write or read operation. The LDPC sequencer 460 may correspond to the ECC circuitry 266 described in FIG. 12.

The controllers 130, 400 described in FIGS. 12 and 13 can manage and control status information about memory blocks within the memory devices 150, 152. For example, the controllers 130, 400 can control and update map information for read operations or program operations, and check and update program-erase cycles (P/E Cycles) that estimate or indicate a wear level of memory blocks for wear leveling. Additionally, the controllers 130, 400 can check the read count among the operation information about the memory block. Further, the controllers 130, 440 may have structural information about the internal configuration (e.g., string sharing) of the memory devices 150, 152.

The controllers 130, 400 can read or load firmware from the memory devices 150, 152 for internal operations. In a process of reading or loading the firmware, stress or read disturb can occur in the location and surrounding locations where the firmware is stored. The device and the operating method described in FIGS. 7 to 11 can reduce or avoid degradation of operational safety regarding the plural firmware copies stored in the memory devices 150, 152 due to stress or read disturbance.

In order to ensure the operational safety of the firmware, the controllers 130, 400 can perform data migration, read retry operations, etc. based on read counts and/or erase/write operations (E/W cycles). Through this, the memory system can reduce an error in a process of reading or loading the firmware stored in the memory devices 150, 152 and improve data input/output performance.

As above described, a memory device or a memory system according to an embodiment of the present disclosure can distribute and store multiple copies of firmware, manage read counts for each plane or page storing each of the multiple copies of firmware, and alternately read the distributedly stored copies of firmware, so that deterioration in operational safety regarding the copy of firmware stored in a specific location can be prevented or avoided.

Further, a memory device or a memory system according to an embodiment of the present disclosure can improve operational efficiency and stability by increasing a lifespan of a memory block in which the firmware is stored.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the embodiments of the present disclosure have been illustrated and described with respect to specific embodiments, it will be apparent to those skilled in the art in light of the present disclosure that various changes and modifications may be made without departing from the spirit and scope of the present disclosure as defined in the following claims. Furthermore, the embodiments may be combined to form additional embodiments.

What is claimed is:

1. A memory system comprising:

a memory device comprising firmware distributed and stored in plural locations; and a controller configured to, at each instance of loading the firmware, alternately read the firmware from a different location selected from among the plural locations based on an estimation of stress or disturb.

2. The memory system according to claim 1, wherein the controller is configured to, after reading the firmware from a first location among the plural locations at a first timing, read the firmware at a second timing from a second location selected from among the plural locations, in which stress or disturb occurs due to a read operation performed in the first location at the first timing.

3. The memory system according to claim 2, wherein a first page included in the first location and a second page included in the second location individually comprise memory cells coupled to a same word line.

4. The memory system according to claim 3, wherein the memory cells included in the first and second pages are disposed on a same memory layer.

5. The memory system according to claim 1, wherein the controller is configured to, after power is supplied, select a location with a lowest at least one of read counts and program/erase cycles, among the plural locations, and load the firmware stored in a selected location.

6. The memory system according to claim 1, wherein each of the plural locations includes plural pages included in different memory blocks or different memory planes.

7. The memory system according to claim 6, wherein the plural pages are consecutive pages.

8. The memory system according to claim 6, wherein the controller is configured to read the firmware including several parts stored in the plural pages, each part stored in the different memory blocks or the different memory planes.

9. The memory system according to claim 8, wherein the controller is configured to read a first part of the firmware from a first memory plane in the memory device and a second part, which is distinguished from the first part, from a second memory plane in the memory device.

10. The memory system according to claim 1, wherein the controller is further configured to:

generate or update at least one of read counts and program/erase cycles in each at least one of memory block, memory plane, and memory page, which is associated with the plural locations; and store the at least one of generated or updated read counts and program/erase cycles in the memory device.

11. The memory system according to claim 8, wherein the controller is further configured to select an access location of the firmware so that a deviation of at least one of read counts and program/erase cycles for each of the plural locations is reduced.

12. A controller coupled to a memory device in which firmware is copied and stored in plural locations, wherein the controller comprises at least one processor and at least one memory and is configured to:

load the firmware stored in a location selected alternately from among the plural locations;

estimate another location from among the plural locations subjected to stress or disturb by loading the firmware; and designate the estimated location as the selected location for a next loading of the firmware.

13. The controller according to claim 12, wherein the controller is further configured to:

compare at least one of read counts and program/erase cycles for each of the plural locations; and designate, as the selected location, a location with a lowest at least one of read counts and program/erase cycle among the plural locations.

14. The controller according to claim 12, wherein each of the plural locations comprises plural pages included in different memory blocks or different memory planes.

15. The controller according to claim 14, wherein the controller is configured to read the firmware including several parts stored in the plural pages, each part stored in the different memory blocks or the different memory planes.

16. The controller according to claim 12, wherein the controller is further configured to:

generate or update at least one of read counts and program/erase cycles in each memory block, each memory plane, and/or each memory page, which is associated with the plural locations; and store the at least one of generated or updated read counts and program/erase cycles in the memory device.

17. The controller according to claim 12, wherein the controller is further configured to select an access location of the firmware so that a deviation of the at least one of read counts and program/erase cycles for each of the plural locations is reduced.

18. A method for operating a memory system, the method comprising:

selecting at least one of plural locations in a memory device, the plural locations storing firmware;

loading the firmware stored in a location selected alternately from among the plural locations;

estimating another location from among the plural locations subjected to stress or disturb by the loading; and designating the estimated location as the selected location for a next loading of the firmware.

19. The method according to claim 18, further comprising:

comparing at least one of read counts and program/erase cycles for each of the plural locations; and designating, as the selected location, a location with a lowest at least one of the read count and the program/erase cycle among the plural locations.

20. The method according to claim 18, further comprising:

selecting an access location of the firmware so that a deviation of at least one of read counts and program/erase cycles for each of the plural locations is reduced.

* * * * *